United States Patent
Kolze et al.

(10) Patent No.: US 8,401,132 B2
(45) Date of Patent: Mar. 19, 2013

(54) INTERFERENCE CANCELLATION WITH TIME-VARYING INTERFERENCE AND/OR DISTORTION

(75) Inventors: Thomas Joseph Kolze, Phoenix, AZ (US); Bruce J. Currivan, Dove Canyon, CA (US)

(73) Assignee: Broadcom Corporation, Irvine, CA (US)

( * ) Notice: Subject to any disclaimer, the term of this patent is extended or adjusted under 35 U.S.C. 154(b) by 152 days.

(21) Appl. No.: 12/899,997

(22) Filed: Oct. 7, 2010

(65) Prior Publication Data
US 2011/0021170 A1    Jan. 27, 2011

Related U.S. Application Data

(63) Continuation-in-part of application No. 12/078,923, filed on Apr. 8, 2008, now Pat. No. 8,180,001.

(60) Provisional application No. 61/282,165, filed on Dec. 23, 2009, provisional application No. 60/960,868, filed on Oct. 17, 2007.

(51) Int. Cl.
*H03D 1/04* (2006.01)
*H03H 7/30* (2006.01)

(52) U.S. Cl. .................................... 375/346; 375/232

(58) Field of Classification Search .................. 455/296; 375/346, 232, 350
See application file for complete search history.

(56) References Cited

U.S. PATENT DOCUMENTS

| | | |
|---|---|---|
| 6,798,854 B2 | 9/2004 | Kolze et al. |
| 7,050,516 B2 | 5/2006 | Currivan et al. |
| 7,110,434 B2 | 9/2006 | Currivan et al. |

(Continued)

FOREIGN PATENT DOCUMENTS
EP    1722478 A1    11/2006

OTHER PUBLICATIONS

Non-Final Rejection mailed Nov. 5, 2012, in U.S. Appl. No. 13/451,199, Kolze et al., filed Apr. 19, 2012.

*Primary Examiner* — David C. Payne
*Assistant Examiner* — Brian J Stevens
(74) *Attorney, Agent, or Firm* — Sterne, Kessler, Goldstein & Fox P.L.L.C.

(57) ABSTRACT

A communications receiver includes a noise analyzer to characterize the composition of the interference and/or distortion impressed onto a transmitted communications signal in the presence of one or more time-varying conditions. The noise analyzer may provide a selection signal indicating the composition of the interference and/or distortion impressed onto a transmitted communications signal in the presence of one or more time-varying conditions to be used by the communications receiver. In an exemplary embodiment, the communications receiver selects at least one set of filter coefficients to compensate for the interference and/or distortion impressed onto a transmitted communications signal in the presence of a particular time-varying interference and/or distortion condition. In another exemplary embodiment, the communications receiver selects a corresponding interference cancellation filter bank to compensate for the interference and/or distortion impressed onto a transmitted communications signal in the presence of the particular time-varying interference and/or distortion condition.

20 Claims, 19 Drawing Sheets

U.S. PATENT DOCUMENTS

| | | |
|---|---|---|
| 7,190,710 B2 | 3/2007 | Yousef et al. |
| 7,236,545 B2 | 6/2007 | Kolze |
| 7,308,050 B2 | 12/2007 | Kolze et al. |
| 8,180,001 B2 * | 5/2012 | Kolze et al. .................. 375/346 |
| 2002/0073432 A1 | 6/2002 | Kolze |
| 2002/0094044 A1 | 7/2002 | Kolze et al. |
| 2002/0186753 A1 | 12/2002 | Kolze |
| 2002/0186793 A1 | 12/2002 | Kolze et al. |
| 2003/0012127 A1 | 1/2003 | Kolze |
| 2003/0031198 A1 | 2/2003 | Currivan et al. |
| 2003/0174767 A1 | 9/2003 | Fujii et al. |
| 2003/0185174 A1 | 10/2003 | Currivan et al. |
| 2003/0185314 A1 | 10/2003 | Kolze |
| 2003/0202567 A1 | 10/2003 | Yousef et al. |
| 2004/0184571 A1 | 9/2004 | Currivan et al. |
| 2005/0232196 A1 | 10/2005 | Joshi et al. |
| 2006/0114982 A1 * | 6/2006 | Liu et al. ....................... 375/232 |
| 2006/0133471 A1 * | 6/2006 | Ki .................................. 375/232 |
| 2007/0032256 A1 | 2/2007 | Kolze |
| 2007/0061642 A1 | 3/2007 | Currivan et al. |
| 2007/0097928 A1 | 5/2007 | Anderson |
| 2007/0165628 A1 | 7/2007 | Choi et al. |
| 2008/0187038 A1 | 8/2008 | Currivan et al. |

* cited by examiner

INTERFERENCE CANCELLATION WITH TIME-VARYING INTERFERENCE AND/OR DISTORTION

CROSS-REFERENCE TO RELATED APPLICATIONS

The present application claims the benefit of U.S. Provisional Patent Application No. 61/282,165, filed Dec. 23, 2009, and is a continuation in part of U.S. patent application Ser. No. 12/078,923, filed Apr. 8, 2008, which claims the benefit of U.S. Provisional Patent Application No. 60/960,868, filed Oct. 17, 2007, all of which are incorporated herein by reference in their entirety.

FIELD OF THE INVENTION

The present invention relates generally to an interference cancellation filter and specifically to using the interference cancellation filter to compensate for interference and/or distortion impressed onto a transmitted communications signal in the presence of time-varying conditions.

BACKGROUND

A communications system typically involves transmitting a sequence of data from a communications transmitter to a communications receiver over a communications channel. The communications transmitter and/or the communications receiver may include one or more cable modems, set-top boxes, mobile radios, laptop modems, and/or cellular telephones to provide some examples. The communications channel may include a microwave radio link, a satellite channel, a fiber optic cable, or a copper cable to provide some examples. The communications channel contains a propagation medium that a transmitted communications signal passes through before reception by the communications receiver. The propagation medium of the communications channel introduces interference and/or distortion into the transmitted communications signal causing a received communications signal to differ from the transmitted communications signal. The communications channel may introduce additional interference and/or distortion resulting from undesirable signals and/or noise into the transmitted communications signal. The communications transmitter and/or the communications receiver may introduce further interference and/or distortion into the transmitted communications signal causing the received communications signal to differ from the transmitted communications signal.

Communications systems may use an adjustable filter in the form of an interference cancellation filter to reduce the effect of the interference and/or distortion attributable to the communications channel, the communications transmitter, and/or the communications receiver. To compensate for this interference and/or the distortion, a conventional interference cancellation filter may adaptively adjust an impulse response by updating interference cancellation filter coefficients through, for example, a least-squares algorithm, such as the widely known Least Mean Squared (LMS), Recursive Least Squares (RLS), Minimum Mean Squared Error (MMSE) algorithms or any suitable equivalent algorithm that yields a least-squares result. Alternatively, the conventional interference cancellation filter may employ techniques disclosed in (i) U.S. patent application Ser. No. 10/142,189, filed May 8, 2002, entitled "Cancellation of Interference in a Communication System with Application to S-CDMA," now U.S. Pat. No. 7,110,434;

(ii) U.S. patent application Ser. No. 10/242,032, filed Sep. 12, 2002, entitled "Successive Interference Canceling for CDMA," now U.S. Pat. No. 7,190,710;

(iii) U.S. patent application Ser. No. 10/136,059, filed Apr. 30, 2002, entitled "Chip Blanking and Processing in SCDMA to Mitigate Impulse and Burst Noise and/or Distortion," now U.S. Pat. No. 7,236,545;

(iv) U.S. patent application Ser. No. 10/000,415, filed Nov. 2, 2001, entitled "Detection and Mitigation of Temporary Impairments in a Communications Channel," now U.S. Pat. No. 7,308,050;

(v) U.S. patent application Ser. No. 10/962,803, filed Oct. 12, 2004, entitled "Chip Blanking and Processing in SCDMA to mitigate impulse and burst noise and/or distortion," now U.S. Pat. No. 7,366,258;

(vi) U.S. patent application Ser. No. 11/089,139, filed Mar. 24, 2005, entitled "Cancellation of Burst Noise in a Communication System with Application to S-CDMA," now U.S. Pat. No. 7,415,061; and (vii) U.S. patent application Ser. No. 10/237,853, filed Sep. 9, 2002, entitled "Detection and Mitigation of Temporary (Bursts) Impairments in Channels using SCDMA," now U.S. Pat. No. 7,570,576, each of which is incorporated herein by reference in its entirety.

These conventional interference cancellation approaches use, in part, a scheme tantamount of time-averaging to determine correlation properties of the interference and/or distortion. Commonly, the interference and/or distortion introduced by the communications channel may include one or more time-varying conditions. The conventional interference cancellation filter may not properly determine the correlation properties of the interference and/or distortion in the presence of the one or more time-varying conditions. In this situation, the least-squares algorithm or the suitable equivalent may inadequately train the conventional interference cancellation filter to compensate for the interference and/or distortion. To provide some robustness against time-varying interference, conventional cancellation or mitigation techniques have added some nonlinear processing to the time-averaging results. For example, conventional nonlinear processing may include taking frequency bins with relatively large interference power for a brief time, and holding a higher power value. Still, the result of these conventional techniques is a single time-average capture of the interference characteristics, but modified from the true time-average in a manner to provide robustness against dimensions of interference which occasionally incur relatively large power. The result of nonlinearly treating the time-averaging, and introducing larger-than-averaged interference estimates in some dimensions, is that when extremely powerful interference is present it will be greatly reduced as it appears at a decision point in the receiver. However, typically this processing also incurs the property that when the interference is not extreme, the noise power at a decision point will be increased compared to the noise which would be at the decision point with true time-averaging. Thus, while these prior techniques have been very successful, still, the solution provides robustness in the presence of the occasionally extreme interference in one or more dimensions, but at the sacrifice of some performance when one or more of the dimensions is over-protected Therefore, what is needed is an interference cancellation filter that is capable of compensating for the interference and/or distortion in the presence of the one or more time-varying conditions, without incurring a penalty when the interference is benign.

BRIEF DESCRIPTION OF THE DRAWINGS/FIGURES

The present invention is described with reference to the accompanying drawings. In the drawings, like reference numbers indicate identical or functionally similar elements. The left most digit(s) of a reference number identifies the drawing in which the reference number first appears.

Figure 1:
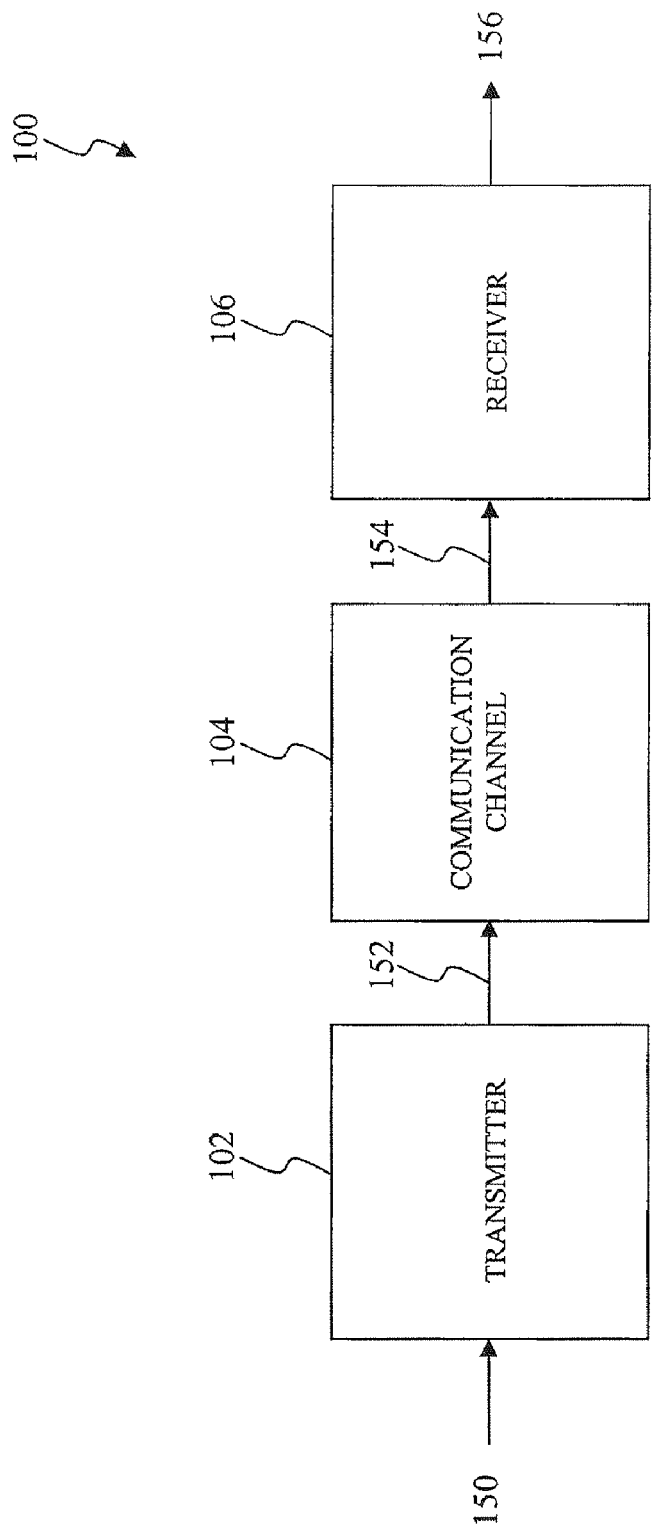
FIG. 1 illustrates a block diagram of a communications environment according to an exemplary embodiment of the present invention.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the present invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present invention. Therefore, the Detailed Description is not meant to limit the present invention. Rather, the scope of the present invention is defined only in accordance with the following claims and their equivalents.

The following Detailed Description of the exemplary embodiments will so fully reveal the general nature of the present invention that others can, by applying knowledge of those skilled in relevant art(s), readily modify and/or adapt for various applications such exemplary embodiments, without undue experimentation, without departing from the spirit and scope of the present invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Communications Environment

FIG. 1 illustrates a block diagram of a communications environment according to an exemplary embodiment of the present invention. The communications environment 100 includes a communications transmitter 102 to transmit a one or more sequences of data 150 as received from one or more transmitter user devices to a communications receiver 106 via a communications channel 104. The one or more transmitter user devices may include, but are not limited to, personal computers, data terminal equipment, telephony devices, mobile communication devices, broadband media players, personal digital assistants, software applications, or any other device capable of transmitting and/or receiving data.

The communications transmitter 102 provides a transmitted communications signal 152 based on the one or more sequences of data 150. The transmitted communications signal 152 may include a time division multiple access (TDMA) communications signal, an orthogonal frequency division multiplexed (OFDM) communications signal, a synchronous code division multiple access (SCDMA) communications signal, any other communications signal that includes orthogonal signaling dimensions, or any combination thereof. The transmitted communications signal 152 may additionally include active signaling dimensions, inactive signaling dimensions, or any combination of active and inactive signaling dimensions. The active signaling dimensions represent one or more signaling dimensions of the transmitted communications signal 152 that include information for communication, such as a representation of at least some of the one or more sequences of data 150 to provide an example, whereas the inactive signaling dimensions represent one or more signaling dimensions of the transmitted communications signal 152 that does not include the information for communication. The inactive signaling dimensions may contain significant power, such as pilots or preambles to provide some examples. Alternatively, the inactive signaling dimensions may represent one or more signaling dimensions of the transmitted communications signal 152 that include traces of the information for communication, that is, greatly diminished in power. In an exemplary embodiment, the active signaling dimensions (or vectors or waveforms) and/or inactive signaling dimensions are substantially orthogonal; however, they are not required to be absolutely orthogonal. It should be noted that any indexing or numbering associated with the inactive signaling dimensions and/or active signaling dimensions used herein is arbitrary, those skilled in the relevant art(s) may implement the indexing or numbering of the signaling dimensions differently without departing from the spirit and scope of the present invention. For example, the active signaling dimensions and the inactive signaling dimensions may be interspersed for a given numbering scheme. As another example, the active signaling dimensions and the inactive signaling dimensions may also vary between communications. In other words, the communications transmitter 102 may vary which ones of the signaling dimensions are active signaling dimensions and inactive signaling dimensions within the transmitted communications signal 152.

The transmitted communications signal 152 passes through the communications channel 104 to provide a received communications signal 154. The communications channel 104 may include, but is not limited to, a microwave radio link, a satellite channel, a fiber optic cable, a hybrid fiber optic cable system, or a copper cable to provide some examples. The communications channel 104 contains a propagation medium that the transmitted communications signal 152 passes through before reception by the communications receiver 106. The propagation medium of the communications channel 104 as well as the communications transmitter 102 and/or the communications receiver 106 may introduce interference and/or distortion into the transmitted communications signal 152 causing the received communications signal 154 to differ from the transmitted communications signal 152.

The communications receiver 106 observes the received communications signal 154 as it passes through the communications channel 104. Similar to the transmitted communications signal 152, the received communications signal 154 may include active signaling dimensions, inactive signaling dimensions, or any combination active and inactive signaling dimensions. The communication receiver 106 observes the active signaling dimensions and/or the inactive signaling dimensions of the received communications signal 154 to observe the interference and/or distortion impressed upon the transmitted communications signal 152. In an exemplary embodiment, the communication receiver 106 only observes the inactive signaling dimensions of the received communications signal 154 to observe the interference and/or distortion embedded within the transmitted communications signal 152.

The communications receiver 106 compensates for the interference and/or distortion impressed upon the transmitted communications signal 152 in the presence of one or more time-varying conditions. The communications receiver 106 then determines a most-likely transmitted sequence of modulation symbols of the transmitted communications signal 152 to provide one or more sequences of recovered data 156. The one or more sequences of recovered data 156 is provided to one or more receiver user devices such as, but not limited to, personal computers, data terminal equipment, telephony devices, mobile communication devices, broadband media players, personal digital assistants, software applications, or any other device capable of transmitting and/or receiving data.

As will be understood by persons skilled in the relevant art(s) from the teachings provided herein, the communications transmitter 102 and/or the communications receiver 106 may be readily implemented in hardware, software, or a combination of hardware and software. For example, based on the teachings provided herein, those skilled in the relevant art(s) may implement the communications transmitter 102 and/or the communications receiver 106 via a combination of one or more application specific integrated circuits and a processor core for implementing software commands stored in one or more memories. However, this example is not limiting, and other implementations are within the scope and spirit of the present invention.

Figure 2:
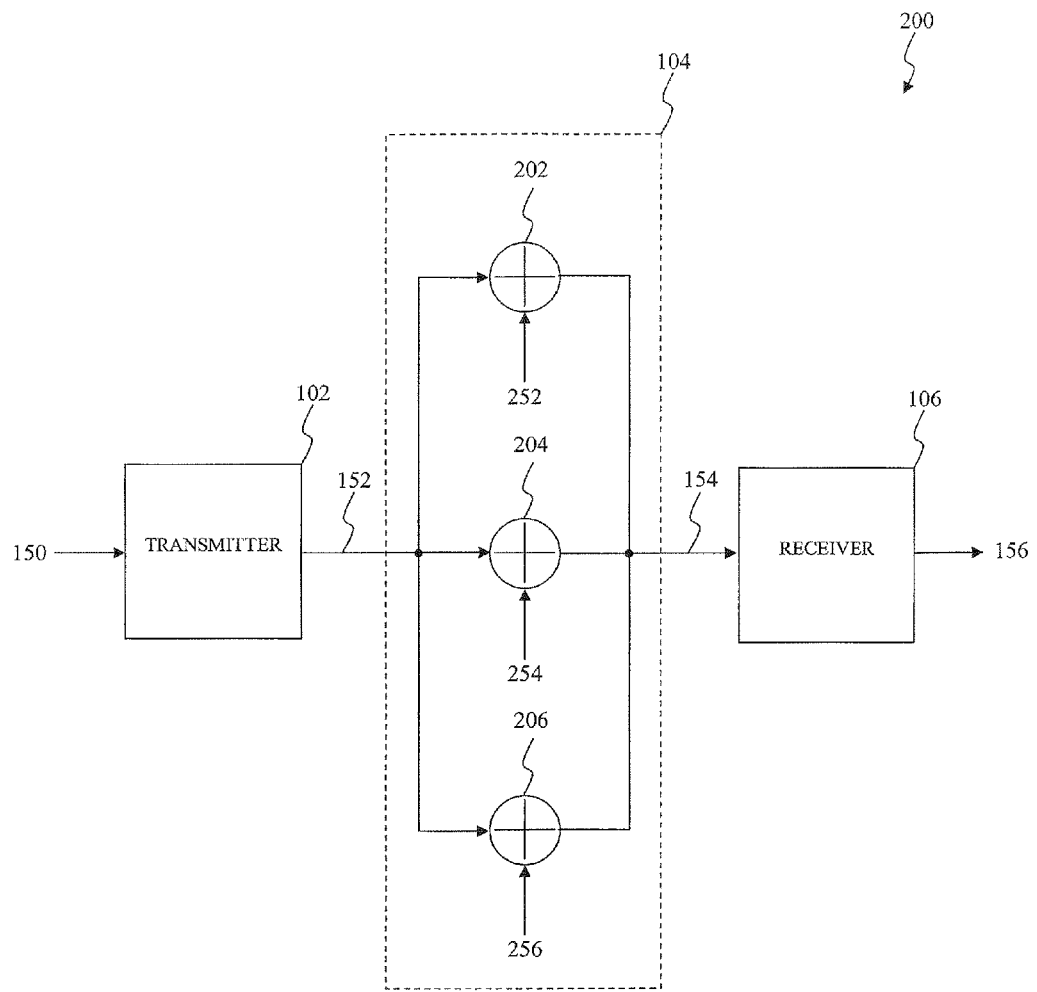
FIG. 2 illustrates a communications channel of the communications environment according to an exemplary embodiment of the present invention.

FIG. 2 illustrates a communications channel of the communications environment according to an exemplary embodiment of the present invention. A communications system 200 includes the communications transmitter 102 to transmit the transmitted communications signal 152 to the communications receiver 106 via the communications channel 104.

As shown in FIG. 2, the communications channel 104 may be approximated, in part, by a summation module 202, a summation module 204, and a summation module 206. The summation module 202 embeds an interference 252 resulting from the communications transmitter 102 within the transmitted communications signal 152. Likewise, the summation module 204 embeds an interference 254 resulting from the communications channel 104 within transmitted communications signal 152. Similarly, the summation module 206 embeds an interference 256 resulting from the communications receiver 106 within the transmitted communications signal 152. Herein, a reference to interference and/or distortion refers to any combination of the interference 252, the interference 254, and/or the interference 256.

Although not shown in FIG. 2, the interference and/or distortion, as discussed above, may additionally include other noise(s) and/or distortion(s), such as linear filtering distortion to provide an example, and/or other non-linear noise(s) and/or other non-linear distortion (s) that may not be additive in nature. For example, the interference and/or distortion may include one or more time-varying conditions such that the interference and/or distortion, in its entirety, may be time-varying. In this situation, the interference and/or distortion is not stationary, rather statistics of the interference and/or distortion vary with time. For instance, the interference and/or distortion may include a narrowband, high powered component having a lesser duty cycle and a wider band, lower power component having a greater duty cycle. Because of the lesser duty cycle, the narrowband, high powered component represents a time-varying condition by only contributing to the interference and/or distortion for a relatively short duration in time as compared to the wider band, lower power component having the greater duty cycle.

Referring back to FIG. 1, the communications receiver 106 may include an interference cancellation filter to increase an ability of the communications receiver 106 to determine the most-likely transmitted sequence of modulation symbols of the transmitted communications signal 152. A conventional interference cancellation filter adaptively adjusts an impulse response by updating a set of interference cancellation filter coefficients to compensate for the interference and/or distortion. However, a conventional interference cancellation filter uses a scheme tantamount of time-averaging to determine correlation properties of the interference and/or distortion embedded within the transmitted communications signal 152. As a result, the conventional interference cancellation filter may not adequately update the set of interference cancellation filter coefficients when the interference and/or distortion includes the one or more time-varying conditions. For example, the conventional interference cancellation filter may not adequately compensate for the narrowband, high powered component having the lesser duty cycle in the presence of the wider band, lower power component having the greater duty cycle. In this situation, the wider band, lower power component having the greater duty cycle may mask the narrowband, high powered component having the lesser duty cycle.

First Exemplary Communications Receiver

Figure 3:
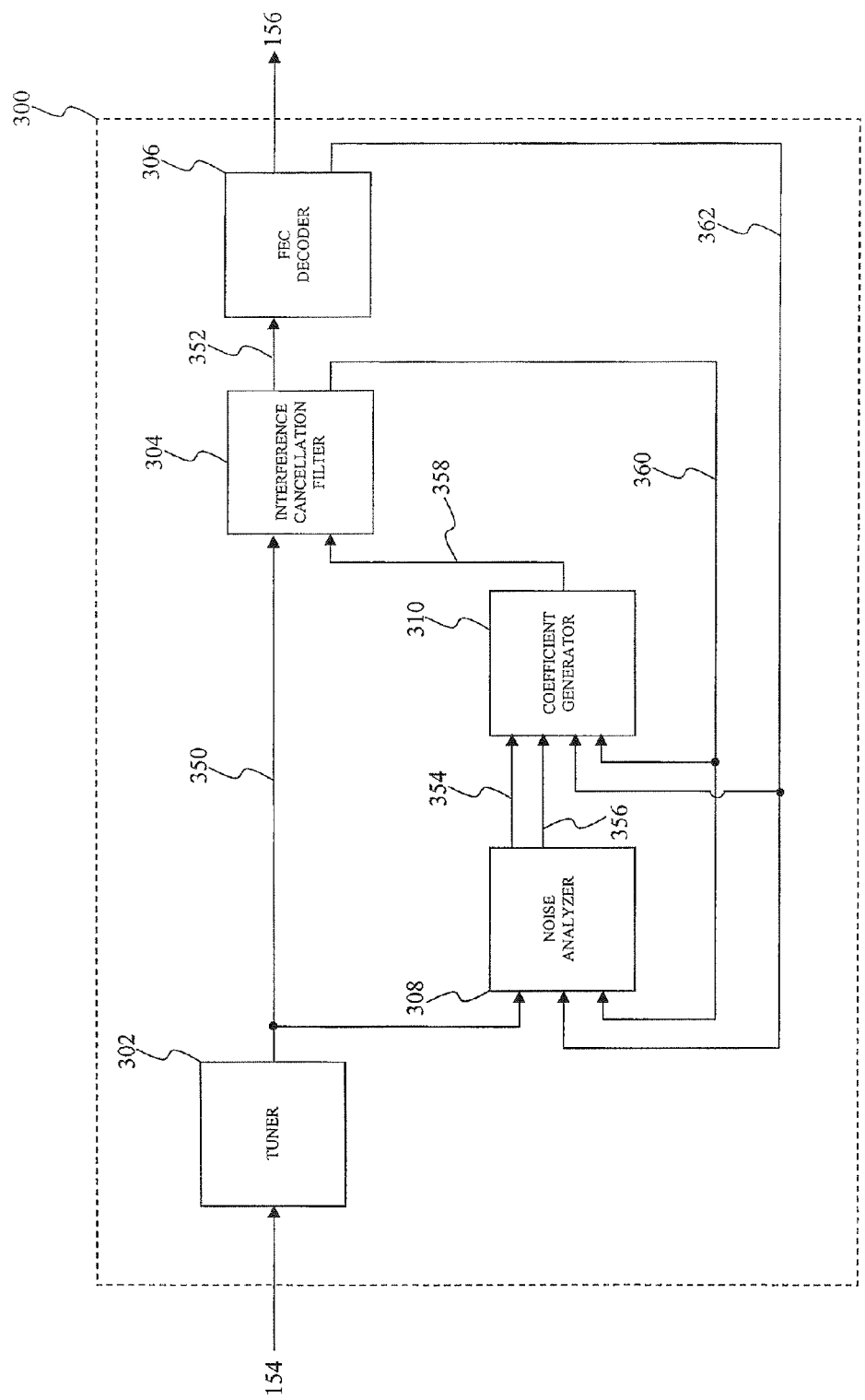
FIG. 3 illustrates a first block diagram of the communications receiver used in the communications environment according to a first exemplary embodiment of the present invention.

FIG. 3 illustrates a first block diagram of the communications receiver used in the communications environment according to a first exemplary embodiment of the present invention. A communications receiver 300 observes the received communications signal 154 as it passes through the communications channel 104. The received communications signal 154 may include the interference and/or distortion including the one or more time-varying conditions. For example, the one or more time-varying conditions may include a first interference and/or distortion condition corresponding to the narrowband, high powered component having the lesser duty cycle, a second interference and/or distortion condition corresponding to the wider band, lower power component having the greater duty cycle and/or a third interference and/or distortion condition corresponding to both the narrowband, high powered component and the wider band, lower power component. The communications receiver 300 compensates for the interference and/or distortion impressed onto the transmitted communications signal 152 in the presence of the one or more time-varying conditions. The communications receiver 300 may represent an exemplary embodiment of the communications receiver 106.

The communication receiver 300 may observe the one or more inactive signaling dimensions of the received communications signal 154 to compensate for the interference and/or distortion impressed upon the transmitted communications signal 152 in the presence of the one or more time-varying conditions. The inactive signaling dimensions of the received communications signal 154 represent one or more signaling dimensions of the transmitted communications signal 152 that do not include information for communication, but may contain pilots or preambles, and/or one more signaling dimensions of the transmitted communications signal 152 that include the information for communication but greatly diminished in power. Alternatively, the communications transmitter 102 may momentarily inactivate the active signaling dimensions of the transmitted communications signal 152 such that the active signaling dimensions of the received communications signal 154 are, in effect, inactive signaling dimensions. The communications receiver 106 assesses its effectiveness at reducing the interference and/or distortion impressed upon the transmitted communications signal 152 in the presence of the one or more time-varying conditions by comparing a signal metric of one or more of the inactive signaling dimensions of the received communications signal 154 before and after the application of an interference canceling operation, such as disclosed in U.S. patent application Ser. No. 10/000,415, filed Nov. 2, 2001, entitled "Detection and Mitigation of Temporary Impairments in a Communications Channel," now U.S. Pat. No. 7,308,050, which is incorporated herein by reference in its entirety. The comparison of the signal metric provides a measure of cancellation of the interference and/or distortion without the presence of the information for communication. Such comparison may be made for one or multiple sets of the interference cancellation filter coefficients to determine which of the one or more time-varying conditions are present or dominant. Additionally, this comparison may reveal if a completely new or additional set of the interference cancellation filter coefficients needs to be characterized that is better suited to compensate for the interference and/or distortion.

Alternatively, the communication receiver 106 may observe one or more active signaling dimensions of the received communications signal 154 to compensate for the interference and/or distortion impressed upon the transmitted communications signal 152 in the presence of the one or more time-varying conditions. The active signaling dimensions of the received communications signal 154 represent one or more signaling dimensions of the transmitted communications signal 152 that include the information for communication. The communications receiver 106 operates on the active signaling dimensions to mitigate or reduce, i.e., cancel, the interference and/or distortion impressed upon the transmitted communications signal 152 in the presence of the one or more time-varying conditions to provide estimates of the transmitted communications signal 152. The communications receiver 106 may use the estimates of the information for communication to substantially reduce the information for communication from the active signaling dimensions of the received communications signal 154 to allow the communications receiver 106 to carry out the operations of the communications receiver 106, as discussed above, as if the active signaling dimensions of the received communications signal 154 are, in fact, inactive signaling dimensions. The communications receiver 106 may additionally update one or more sets of the interference cancellation filter coefficients used to compensate for the interference and/or distortion impressed upon the transmitted communications signal 152 to further reduce the interference and/or distortion impressed upon the transmitted communications signal 152 in the presence of the one or more time-varying conditions. The communications receiver 106 assesses its effectiveness at reducing the interference and/or distortion impressed upon the transmitted communications signal 152 in the presence of the one or more time-varying conditions by comparing the signal metric of one or more of the active signaling dimensions of the received communications signal 154 before and after the application of an interference canceling operation. The comparison of the signal metric provides a measure of cancellation of the interference and/or distortion with the presence of the information for communication substantially removed. Such comparison may be made for one or multiple sets of the interference cancellation filter coefficients to determine which of the one or more time-varying conditions are present or dominant. Additionally, this comparison may reveal if a completely new or additional set of the interference cancellation filter coefficients needs to be characterized that is better suited to compensate for the interference and/or distortion.

As shown in FIG. 3, the communications receiver 300 includes a communications tuner 302, an interference cancellation filter 304, a forward error correction (FEC) decoder 306, a noise analyzer 308, and a coefficient generator 310. The communications tuner 302 operates upon the received communications signal 154 to provide a noisy sequence of data 350. For example, the communications tuner 302 may frequency translate or downconvert and/or demodulate the received communications signal 154 to a baseband frequency, an intermediate frequency (IF), or any other suitable frequency using a suitable downconversion process that will be apparent to those skilled in the art(s). The communications tuner 302 may additionally perform functions such as, but not limited to, timing recovery, frequency estimation, carrier and/or phase recovery, automatic gain control (AGC) and/or any other parameter estimation of the received communications signal 154 that will be apparent to those skilled in the art(s). The noisy sequence of data 350 includes the active signaling dimensions and/or the inactive signaling dimensions including the interference and/or distortion having the one or more time-varying conditions. The one or more time-varying conditions may include the first time-varying condition, and/or the second time-varying condition as discussed above. However, this example is not limiting, those skilled in the relevant art(s) will recognize that the noisy sequence of data 350 may include the active signaling dimensions and/or the inactive signaling dimensions including the interference and/or distortion resulting from different time-varying conditions without departing from the spirit and scope of the present invention.

The interference cancellation filter 304 compensates for the interference and/or distortion in the presence of the one or more time-varying conditions embedded in the active signaling dimension of the noisy sequence of data 350 to provide a noise compensated sequence of data 352. More specifically, the interference cancellation filter 304 compensates for the interference and/or distortion in:

1. the absence of the first time-varying condition and the second time-varying condition;
2. the presence of the first time-varying condition;
3. the presence of the second time-varying condition; and/or
4. the presence of the first time-varying condition and the second time-varying condition.

However, these examples are not limiting, those skilled in the relevant art(s) will recognize that the interference cancellation filter 304 may compensate for the interference and/or distortion in other time-varying conditions in accordance with the teachings herein without departing from the spirit and scope of the present invention.

The interference cancellation filter 304 then adaptively adjusts an impulse response based upon filter weighting coefficients 358 to compensate for the interference and/or distortion embedded in the active signaling dimension of the noisy sequence of data 350 in the presence of the one or more time-varying conditions.

The interference cancellation filter 304 additionally provides an interference cancellation filter information signal 360 based on the active signaling dimensions of the noisy sequence of data 350 to the noise analyzer 308 and/or the coefficient generator 310. The interference cancellation filter information signal 360 may include signal parameters such as an average power within a bandwidth of the transmitted communications signal 152 over a time interval, a slicer error, a bit error rate (BER), a symbol error rate (SER), a signal to noise ratio (SNR), power in each active signaling dimension, power in each inactive signaling dimension, usually after removal of any pilot or preamble if present, average power in all active signaling dimensions, average power in all inactive signaling dimensions, average power in a plurality of dimensions, ranked power in all active signaling dimensions or derivative thereof (such as largest, top three largest, etc.), ranked power in all inactive signaling dimensions or derivative thereof, any channel fidelity metric such as disclosed in U.S. patent application Ser. No. 10/000,415, filed Nov. 2, 2001, entitled "Detection and Mitigation of Temporary Impairments in a Communications Channel," now U.S. Pat. No. 7,308,050, which is incorporated herein by reference in its entirety, or any other suitable signal parameter that will be apparent to those skilled in the relevant art(s).

The forward error correction (FEC) decoder 306 may substantially correct for errors in the active signaling dimensions of the noise compensated sequence of data 352 using any suitable decoding scheme to provide the one or more sequences of recovered data 156. The decoding scheme may include a block decoding scheme, such as Reed-Solomon decoding, a convolutional decoding scheme, such as the Viterbi algorithm, a concatenated decoding scheme involving inner and outer codes, decoding schemes using iterative decoding, partial decoding, iterative decoding involving iterations between channel estimation and partial decoding and full decoding with impulse or burst noise and/or noise unequally distributed among the signaling dimensions such as colored noise, and/or any other suitable decoding scheme that will be apparent to those skilled in the art(s). In an exemplary embodiment, the FEC decoder is optional. In this exemplary embodiment, the interference cancellation filter 304 may directly generate the one or more sequences of recovered data 156.

The FEC decoder 306 additionally provides a decoder information signal 362 based on the active signaling dimension of the noise compensated sequence of data 352 to the noise analyzer 308 and/or the coefficient generator 310. The decoder information signal 362 may include signal parameters such as code information, state information, symbols or bits which are determined to be incorrect or questionable, likely corrected values for such symbols or bits, probabilities for suggested corrections or a multiplicity of possible choices for a correction, likelihood metrics related to estimated signal fidelity corresponding to a segment of the noise compensated sequence of data 352, or any other suitable signal parameter that will be apparent to those skilled in the relevant art(s). As another example the decoder information signal 362 may represent a decoder metric such as is disclosed in U.S. patent application Ser. No. 10/000,415, filed Nov. 2, 2001, entitled "Detection and Mitigation of Temporary Impairments in a Communications Channel," now U.S. Pat. No. 7,308,050 and U.S. patent application Ser. No. 10/237,853, filed Sep. 9, 2002, entitled "Detection and Mitigation of Temporary (Bursts) Impairments in Channels using SCDMA," now U.S. Pat. No. 7,570,576, each of which is incorporated herein by reference in its entirety. This FEC decoder metric can provide information. For example, a large number of bit or symbol errors, or large path metric, indicates a great deal of noise and/or distortion and/or error; in addition other indicators include too many errors to decode and too many iterations to decode. Any and/or all of these may indicate a less favorable hypothesis for matching the interference, and suggest that a different hypothesis, or a new hypothesis, be implemented for processing the distorted and/or noisy signal.

The noise analyzer 308 analyzes the interference and/or distortion impressed onto the inactive signaling dimensions of the noisy sequence of data 350 using one or more of the inactive signaling dimensions of the noisy sequence of data 350, the interference cancellation filter information signal 360, and/or the decoder information signal 362 to provide the modified sequence of data 354. The noise analyzer 308 spectrally characterizes and/or spectrally modifies the inactive signaling dimensions of the noisy sequence of data 350 to provide the modified sequence of data 354.

The noise analyzer 308 additionally analyzes the interference and/or distortion impressed onto the inactive signaling dimensions of the noisy sequence of data 350 to provide a filter coefficient selection signal 356. The noise analyzer 308 characterizes a composition of the interference and/or distortion embedded within the inactive signaling dimensions of the noisy sequence of data 350 to provide an indication of the respective set of filter weighting coefficients that corresponds with the composition of the interference and/or distortion as the filter coefficient selection signal 356. For example, the noise analyzer 308 may characterize the interference and/or distortion embedded within the inactive signaling dimensions of the noisy sequence of data 350 as:

1. not including the first time-varying condition and the second time-varying condition the noise analyzer 308 provides the filter coefficient selection signal 356 indicative of the absence of the first time-varying condition and the second time-varying condition;
2. including the first time-varying condition, the noise analyzer 308 provides the filter coefficient selection signal 356 indicative of the presence of the first time-varying condition;
3. including the second time-varying condition, the noise analyzer 308 provides the filter coefficient selection signal 356 indicative of the presence of the second time-varying condition; and/or
4. including the first time-varying condition and the second time-varying condition, the noise analyzer 308 provides the filter coefficient selection signal 356 indicative of the presence of the first time-varying condition and the second time-varying condition.

However, these examples are not limiting, those skilled in the relevant art(s) will recognize that the noise analyzer 308 may characterize the interference and/or distortion embedded within the inactive signaling dimensions of the noisy sequence of data 350 as including other time-varying conditions in accordance with the teachings herein without departing from the spirit and scope of the present invention.

The coefficient generator 310 includes one or more sets of filter weighting coefficients for use by the interference cancellation filter 304. The coefficient generator 310 determines which one of the one or more sets of filter weighting coefficients corresponds to the composition of the interference and/or distortion based upon one or more of the filter coefficient selection signal 356, the interference cancellation filter information signal 360, and/or the decoder information signal 362. The coefficient generator 310 may provide a respective set of filter weighting coefficients that corresponds with the composition of the interference and/or distortion as the filter weighting coefficients 358. The coefficient generator 310 may additionally train or update the respective set of filter weighting coefficients in accordance with a weight computation algorithm. For example, the coefficient generator 310 may provide:

1. a first set of filter weighting coefficients corresponding to the absence of the first time-varying condition and the second time-varying condition when the filter coefficient selection signal 356, the interference cancellation filter information signal 360, and/or the decoder information signal 362 indicate the first time-varying condition and the second time-varying condition is absent from the noisy sequence of data 350;
2. a second set of filter weighting coefficients corresponding to the presence of the first time-varying condition when the filter coefficient selection signal 356, the interference cancellation filter information signal 360, and/or the decoder information signal 362 indicate the first time-varying condition is present in the noisy sequence of data 350;
3. a third set of filter weighting coefficients corresponding to the presence of the second time-varying condition when the filter coefficient selection signal 356, the interference cancellation filter information signal 360, and/or the decoder information signal 362 indicate the second time-varying condition is present in the noisy sequence of data 350; and/or
4. a fourth set of filter weighting coefficients corresponding to the presence of the first time-varying condition and the second time-varying condition when the filter coefficient selection signal 356, the interference cancellation filter information signal 360, and/or the decoder information signal 362 indicate the first time-varying condition and the second time-varying condition is present in the noisy sequence of data 350.

However, these examples are not limiting, those skilled in the relevant art(s) will recognize that the coefficient generator 310 may provide other sets of filter weighting coefficients corresponding to other time-varying conditions in accordance with the teachings herein without departing from the spirit and scope of the present invention.

Noise Analyzer of the First Exemplary Communications Receiver

Noise Analysis of Signal Dimensions

Figure 4A:
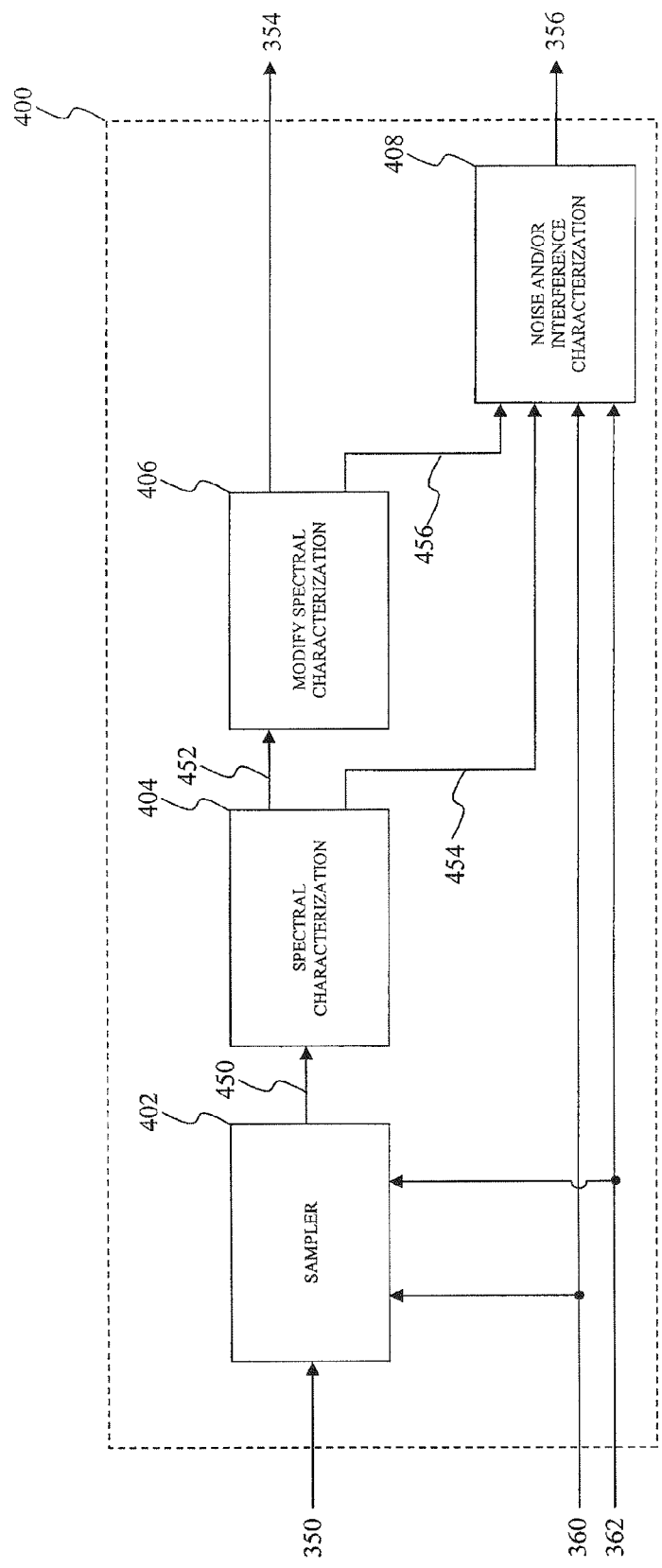
FIG. 4A illustrates a first block diagram of a noise analyzer used in the communications receiver according to a first exemplary embodiment of the present invention.

FIG. 4A illustrates a first block diagram of a noise analyzer used in the communications receiver according to a first exemplary embodiment of the present invention. A noise analyzer 400 spectrally characterizes and/or spectrally modifies the noisy sequence of data 350 to provide the modified sequence of data 354. The noise analyzer 400 additionally analyzes the interference and/or distortion impressed onto the noisy sequence of data 350 to provide the filter coefficient selection signal 356. The noise analyzer 400 characterizes a composition of the interference and/or distortion embedded within the noisy sequence of data 350 and provides an indication of the respective set of filter weighting coefficients that corresponds with the composition of the interference and/or distortion the filter coefficient selection signal 356. The noise analyzer 400 may represent an exemplary embodiment of the noise analyzer 308.

In this exemplary embodiment, the noise analyzer 400 analyzes the interference and/or distortion impressed onto one or more of the signaling dimensions, such as codes, tones, and/or timeslots to provide some examples, of the noisy sequence of data 350. The signaling dimensions may include active signaling dimensions, inactive signaling dimensions, or any combination of active and inactive signaling dimensions. The noise analyzer 400 includes a sampling module 402, a spectral characterization module 404, a modify spectral characterization module 406, and an interference and/or distortion characterization module 408.

The sampling module 402 may sample one or more of the inactive signaling dimensions to provide the sampled sequence of data 450. Alternatively, the sampling module 402 may sample one or more of the active signaling dimensions to provide the sampled sequence of data 450. In this situation, the information for communication, i.e., data is present in the active signaling dimensions during sampling. The data, or at least a portion of the data, however, is removed from the sampled sequence of data 450 by the sampling module 402 using the interference cancellation filter information signal 360 and/or the decoder information signal 362. For example, estimates of the data within the active signaling dimensions may be used to effectively reduce the data within the active signaling such that these active signaling dimensions may be treated as inactive signaling dimensions. As a result, the active signaling dimensions of the noisy sequence of data 350 are, in effect, inactive signaling dimensions. In an additional alternate, the sampling module 402 may sample any combination of the inactive signaling dimensions and the active signaling dimensions to provide the sampled sequence of data 450. The sampling module 402 may additionally despread, mix, and/or demodulate each of the signaling dimensions prior to sampling.

The spectral characterization module 404 spectrally characterizes the sampled sequence of data 450 to provide a spectral characterization 452. More specifically, the spectral characterization module 404 may spectrally characterize the inactive signaling dimensions to provide the spectral characterization 452. The spectral characterization module 404 may provide any suitable statistical metric of the signaling dimensions that will be apparent to those skilled in the relevant art(s) as the spectral characterization 452.

The spectral characterization module 404 additionally provides a spectral characterization information signal 454 based on the sampled sequence of data 450 to communicate information regarding the sampled sequence of data 450, the spectral characterization 452, and/or any suitable information acquired while determining the spectral characterization 452 that will be apparent to those skilled in the relevant art(s) to the interference and/or distortion characterization module 408. The spectral characterization information signal 454 may include statistical metrics of the signaling dimensions that will be apparent to those skilled in the relevant art(s).

The modify spectral characterization module 406 modifies the spectral characterization 452 to provide the modified sequence of data 354. The modify spectral characterization module 406 may raise the noise floor, introduce spectral characteristics that relate to previously present interference and/or distortion, introduce spectral characteristics of expected interference and/or distortion that are expected but that have not recently been present (or at all been present), and other preemptive modifications that will be apparent to those skilled in the relevant art(s).

The modify spectral characterization module 406 additionally provides a modified spectral characterization information signal 456 based on the spectral characterization 452 to communicate information regarding the spectral characterization 452, the modified sequence of data 354 and/or any suitable information acquired while modifying the spectral characterization 452 to the interference and/or distortion characterization module 408. The modified spectral characterization information signal 456 may include statistical metrics such as a noise floor power level, spectral characteristics that relate to previously present interference and/or distortion, spectral characteristics of expected interference and/or distortion that are expected but that have not recently been present (or at all been present), and any other suitable time-domain statistical parameter that will be apparent to those skilled in the relevant art(s).

The interference and/or distortion characterization module 408 analyzes the interference and/or distortion impressed onto the inactive signaling dimensions of the noisy sequence of data 350 based upon at least one of the interference cancellation filter information signal 360, the decoder information signal 362, the spectral characterization information signal 454, and/or the modified spectral characterization information signal 456 to provide the filter coefficient selection signal 356. The interference and/or distortion characterization module 408 characterizes the composition of the interference and/or distortion embedded within the inactive signaling dimensions of the noisy sequence of data 350 using this information and provides the indication of the respective set of filter weighting coefficients that corresponds with the composition of the interference and/or distortion as the filter coefficient selection signal 356. For example, when the interference and/or distortion characterization module 408 characterizes the interference and/or distortion embedded within the inactive signaling dimensions of the noisy sequence of data 350 as:

1. not including the first time-varying condition and the second time-varying condition, the interference and/or distortion characterization module 408 provides the filter coefficient selection signal 356 indicative of the absence of the first time-varying condition and the second time-varying condition;

2. including the first time-varying condition, the interference and/or distortion characterization module 408 provides the filter coefficient selection signal 356 indicative of the presence of the first time-varying condition;

3. including the second time-varying condition, the interference and/or distortion characterization module 408 provides the filter coefficient selection signal 356 indicative of the presence of the second time-varying condition; and/or 4. including the first time-varying condition and the second time-varying condition, the interference and/or distortion characterization module 408 provides the filter coefficient selection signal 356 indicative of the presence of the first time-varying condition and the second time-varying condition.

Noise Analysis of Timeslots in the Time Domain

Figure 4B:
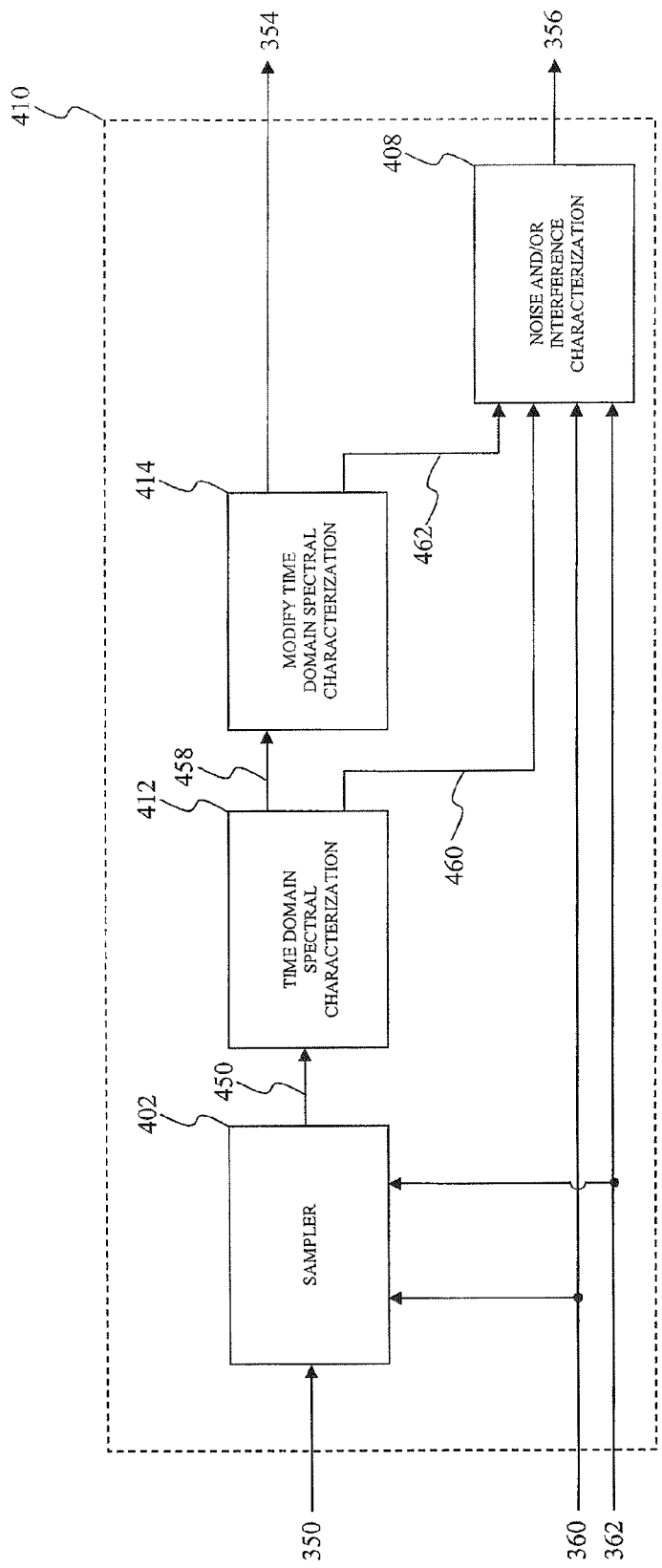
FIG. 4B illustrates a second block diagram of the noise analyzer used in the communications receiver according to a second exemplary embodiment of the present invention.

FIG. 4B illustrates a second block diagram of the noise analyzer used in the communications receiver according to a second exemplary embodiment of the present invention. A noise analyzer 410 spectrally characterizes and/or spectrally modifies the noisy sequence of data 350 in the time domain to provide the modified sequence of data 354. The noise analyzer 410 additionally analyzes the interference and/or distortion impressed onto the noisy sequence of data 350 to provide the filter coefficient selection signal 356. The noise analyzer 410 characterizes a composition of the interference and/or distortion embedded within the noisy sequence of data 350 and provides an indication of the respective set of filter weighting coefficients that corresponds with the composition of the interference and/or distortion as the filter coefficient selection signal 356. The noise analyzer 410 may represent an exemplary embodiment of the noise analyzer 308.

The noise analyzer 410 may include the sampling module 402, the interference and/or distortion characterization module 408, a time domain spectral characterization module 412, and a modify time domain spectral characterization module 414. The sampling module 402 samples the noisy sequence of data 350 to provide the sampled sequence of data 450 in a similar manner as discussed above. Specifically, the noisy sequence of data 350 may include one or more inactive timeslots, one or more active timeslots, or any combination of inactive and active timeslots. However, this example is not limiting those skilled in relevant art(s) will recognize that the noisy sequence of data 350 may include orthogonal codes, tones, or other signaling dimensions without departing from the spirit and scope of the invention. The sampling module 402 samples one or more of the inactive timeslots and or the active timeslots that are, in effect, inactive timeslots to provide the sampled sequence of data 450.

The time domain spectral characterization module 412 spectrally characterizes the sampled sequence of data 450 in the time domain to provide a time domain spectral characterization 458. For example, the time domain spectral characterization module 412 may determine an autocorrelation function of the sampled sequence of data 450 to provide an autocorrelation matrix as the time domain spectral characterization 458. However, this example is not limiting, the time domain spectral characterization module 412 may determine correlation, cross-correlation, or any other suitable time-domain statistical metric that will be apparent to those skilled in the relevant art(s) without departing from the spirit and scope of the present invention.

The time domain spectral characterization module 412 additionally provides a time domain spectral characterization information signal 460 based on the sampled sequence of data 450 to communicate information regarding the sampled sequence of data 450, the time domain spectral characterization 458, and/or any suitable information acquired while determining the time domain spectral characterization 452 that will be apparent to those skilled in the relevant art(s) to the interference and/or distortion characterization module 408. The time domain spectral characterization information signal 454 may include statistical metrics such as a complete or a partial autocorrelation matrix, a complete or a partial correlation matrix, and/or a complete or a partial cross-correlation matrix or any other suitable time-domain statistical parameter that will be apparent to those skilled in the relevant art(s).

The modify time domain spectral characterization module 414 modifies the time domain spectral characterization 458 in the time domain to provide the modified sequence of data 354. The modify time domain spectral characterization module 414 may raise the noise floor, introduce spectral characteristics that relate to previously present interference and/or distortion, introduce spectral characteristics of expected interference and/or distortion that are expected but that have not recently been present (or at all been present), and other preemptive modifications that will be apparent to those skilled in the relevant art(s). For example, the modify time domain spectral characterization module 414 may operate on the time domain spectral characterization 458 in the time domain by altering coefficients of the autocorrelation matrix. As another example, the modify time domain spectral characterization module 414 may alter diagonal components of the autocorrelation matrix.

The modify time domain spectral characterization module 414 may additionally provide a modified time domain spectral characterization information signal 462 based on the time domain spectral characterization 458 to communicate information regarding the time domain spectral characterization 458, the modified sequence of data 354 and/or any suitable information acquired while modifying the time domain spectral characterization 458 to the interference and/or distortion characterization module 408. The modified time domain spectral characterization information signal 462 may include statistical metrics such as a noise floor power level, spectral characteristics that relate to previously present interference and/or distortion, spectral characteristics of expected interference and/or distortion that are expected but that have not recently been present (or at all been present), and any other suitable time-domain statistical parameter that will be apparent to those skilled in the relevant art(s).

The sampling module 402, the time domain spectral characterization module 404, and the modify time domain spectral characterization module 414 are further described in U.S. patent application Ser. No. 09/878,730, filed Jun. 11, 2001, entitled "System and Method for Canceling Interference in a Communications System," now U.S. Pat. No. 6,798,854, which is incorporated herein by reference in its entirety.

The interference and/or distortion characterization module 408 may analyze the interference and/or distortion impressed onto the inactive signaling timeslots of the noisy sequence of data 350 based upon at least one of: the interference cancellation filter information signal 360, the decoder information signal 362, the time domain spectral characterization information signal 460, and/or the modified time domain spectral characterization information signal 462 to provide the filter coefficient selection signal 356 in a similar manner as discussed above.

Noise Analysis of Orthogonal Codes in the Frequency Domain

Figure 4C:
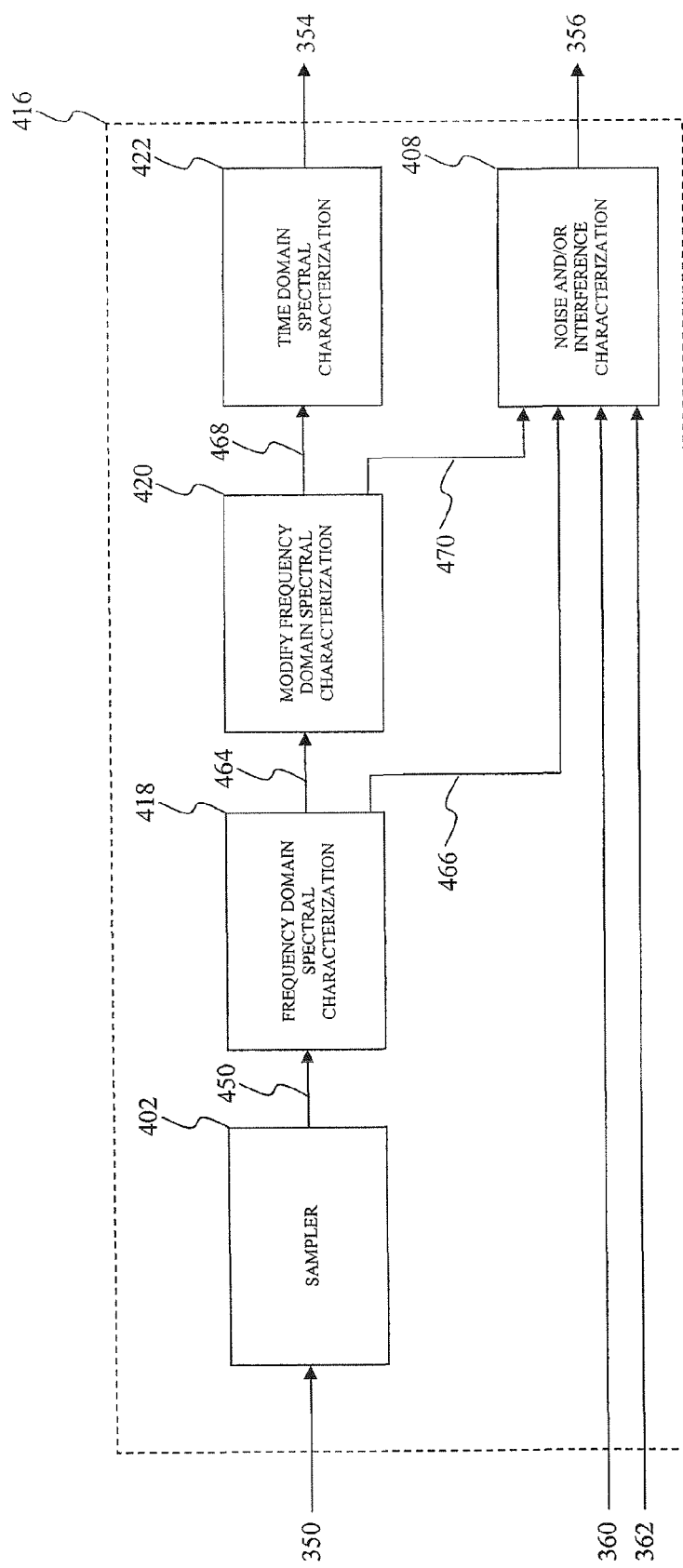
FIG. 4C illustrates a third block diagram of the noise analyzer used in the communications receiver according to a third exemplary embodiment of the present invention.

FIG. 4C illustrates a third block diagram of the noise analyzer used in the communications receiver according to a third exemplary embodiment of the present invention. A noise analyzer 416 spectrally characterizes and/or spectrally modifies the noisy sequence of data 350 in the frequency domain and/or the time domain to provide the modified sequence of data 354. The noise analyzer 416 additionally analyzes the interference and/or distortion impressed onto the noisy sequence of data 350 to provide the filter coefficient selection signal 356. The noise analyzer 416 characterizes a composition of the interference and/or distortion embedded within the noisy sequence of data 350 and provides an indication of the respective set of filter weighting coefficients that corresponds with the composition of the interference and/or distortion as the filter coefficient selection signal 356. The noise analyzer 416 may represent an exemplary embodiment of the noise analyzer 308.

The noise analyzer 416 may include the sampling module 402, the interference and/or distortion characterization module 408, a frequency domain spectral characterization module 418, a modify frequency domain spectral characterization module 420, and a time domain spectral characterization module 422. The sampling module 402 samples the noisy sequence of data 350 to provide the sampled sequence of data 450 in a similar manner as discussed above. Specifically, the noisy sequence of data 350 may include one or more inactive orthogonal codes, one or more active orthogonal codes, or any combination of inactive and active orthogonal codes. However, this example is not limiting those skilled in relevant art(s) will recognize that the noisy sequence of data 350 may include timeslots tones, or other signaling dimensions without departing from the spirit and scope of the invention. The sampling module 402 samples one or more of the inactive orthogonal codes and or the active orthogonal codes that are, in effect, inactive orthogonal codes to provide the sampled sequence of data 450.

The frequency domain spectral characterization module 418 spectrally characterizes the sampled sequence of data 450 in the frequency domain to provide a frequency domain spectral characterization 464. The frequency domain spectral characterization module 418 transforms the sampled sequence of data 450 from the time domain to the frequency domain. For example, the frequency domain spectral characterization module 418 may perform a Fast Fourier Transform (FFT) upon the sampled sequence of data 450 to provide the frequency domain spectral characterization 464. In this example, the frequency domain spectral characterization 464 will include one or more frequency bins within a frequency band of interest. Each frequency bin corresponds to a unique frequency in the frequency band of interest and may include a magnitude component and/or an angular component. Alternatively, the frequency domain spectral characterization module 418 may spectrally characterize the sampled sequence of data 450 in the time domain followed by transforming the sampled sequence of data 450 from the time domain to the frequency domain. In another alternative, the frequency domain spectral characterization module 418 may transform the sampled sequence of data 450 from the time domain to the frequency domain followed by spectrally characterizing the sampled sequence of data 450 in the frequency domain.

The frequency domain spectral characterization module 418 additionally provides a frequency domain spectral characterization information signal 466 based on the sampled sequence of data 450 to communicate information regarding the sampled sequence of data 450, the frequency domain spectral characterization 464, and/or any suitable information acquired while determining the frequency domain spectral characterization 464 to the interference and/or distortion characterization module 408. The frequency domain spectral characterization information signal 466 may include statistical metrics relating to some or all of the frequency bins of the frequency domain spectral characterization 464.

The modify frequency domain spectral characterization module 420 modifies the frequency domain spectral characterization 464 in the frequency domain to provide a modified frequency domain spectral characterization 468. The modify frequency domain spectral characterization module 420 may raise the noise floor, introduce spectral characteristics that relate to previously present interference and/or distortion, introduce spectral characteristics of expected interference and/or distortion that are expected but that have not recently been present (or at all been present), and other preemptive modifications that will be apparent to those skilled in the relevant art(s).

The modify frequency domain spectral characterization module 420 additionally provides a modified frequency domain spectral characterization information signal 470 based on the frequency domain spectral characterization 464 to communicate information regarding the frequency domain spectral characterization 464, the modified frequency domain spectral characterization 468 and/or any suitable information acquired while modifying the frequency domain spectral characterization 464 to the interference and/or distortion characterization module 408. The modified frequency domain spectral characterization information signal 470 may include statistical metrics such as a noise floor power level, spectral characteristics that relate to previously present interference and/or distortion, spectral characteristics of expected interference and/or distortion that are expected but that have not recently been present (or at all been present), and any other suitable frequency domain statistical parameter that will be apparent to those skilled in the relevant art(s).

The time domain spectral characterization module 422 characterizes the modified frequency domain spectral characterization 468 in the time domain to provide the modified sequence of data 354. The time domain spectral characterization module 422 transforms the modified frequency domain spectral characterization 468 from the frequency domain to the time domain. For example, the time domain spectral characterization module 422 may perform an Inverse Fast Fourier Transform (IFFT) upon the modified frequency domain spectral characterization 468 to provide the modified sequence of data 354. The time domain spectral characterization module 422 then spectrally characterizes the modified frequency domain spectral characterization 468 in the time domain to provide the modified sequence of data 354. For example, the time domain spectral characterization module 422 may determine an autocorrelation function of the modified frequency domain spectral characterization 468 to provide an autocorrelation matrix as the modified sequence of data 354. However, this example is not limiting, the time domain spectral characterization module 422 may determine correlation, cross-correlation, or any other suitable time-domain statistical metric that will be apparent to those skilled in the relevant art(s) without departing from the spirit and scope of the present invention.

The time domain spectral characterization module 422 additionally provides a time domain spectral characterization information signal 472 based on the modified frequency domain spectral characterization 468 to communicate information regarding the frequency domain spectral characterization 464, the modified frequency domain spectral characterization 468 and/or any suitable information acquired while characterizing the modified frequency domain spectral characterization 468 to the interference and/or distortion characterization module 408. The time domain spectral characterization information signal 472 may include statistical metrics such as a complete or a partial autocorrelation matrix, a complete or a partial correlation matrix, and/or a complete or a partial cross-correlation matrix or any other suitable time-domain statistical parameter that will be apparent to those skilled in the relevant art(s).

The frequency domain spectral characterization module 418, the modify frequency domain spectral characterization module 420, and the time domain spectral characterization module 422 are further described in U.S. patent application Ser. No. 09/878,730, filed Jun. 11, 2001, entitled "System and Method for Canceling Interference in a Communications System," now U.S. Pat. No. 6,798,854, which is incorporated herein by reference in its entirety.

The interference and/or distortion characterization module 408 may analyze the interference and/or distortion impressed onto the noisy sequence of data 350 based upon at least one of: the interference cancellation filter information signal 360, the decoder information signal 362, the frequency domain spectral characterization information signal 466, and/or the modified frequency domain spectral characterization information signal 470 to provide the filter coefficient selection signal 356 in a similar manner as discussed above.

Coefficient Generator of the First Exemplary Communications Receiver

Figure 5A:
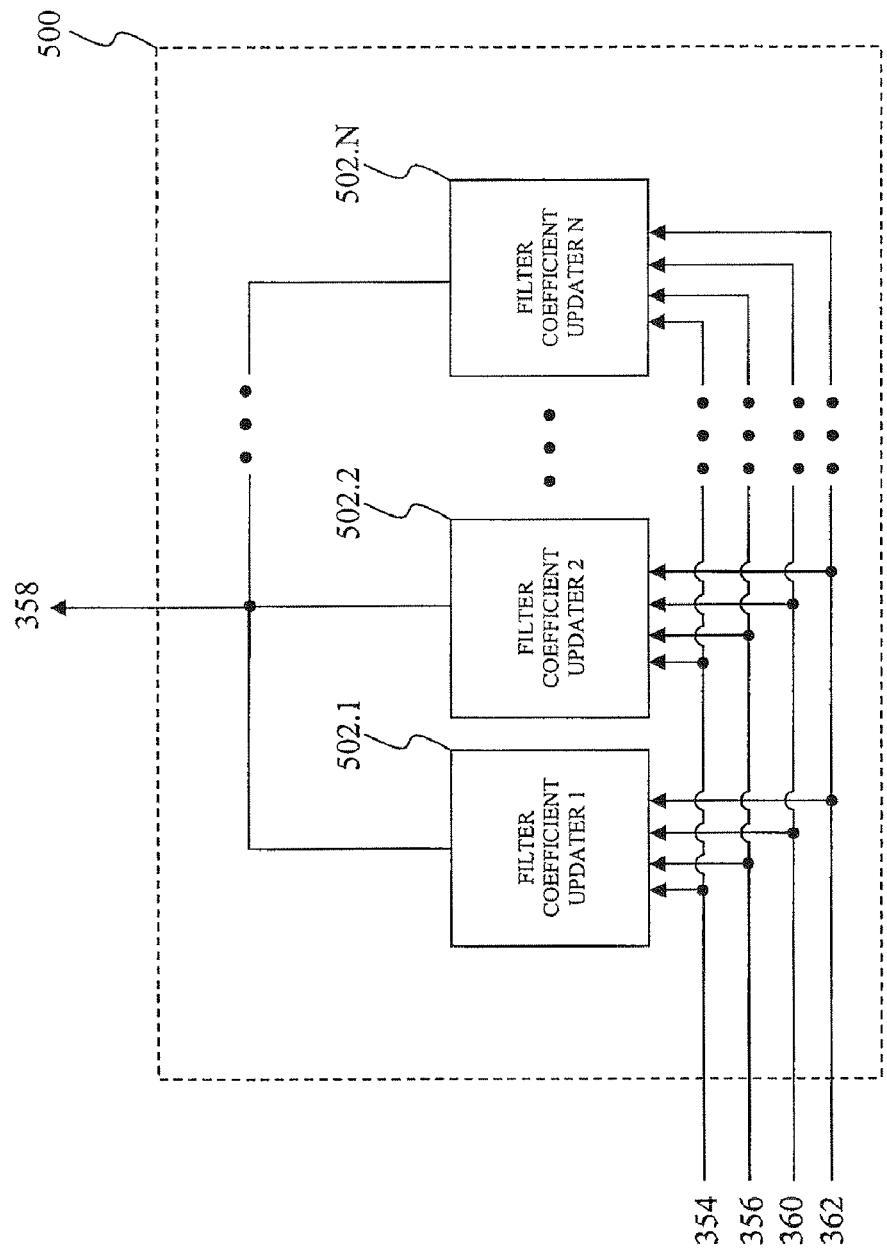
FIG. 5A illustrates a first block diagram of a coefficient generator used in the communications receiver according to a first exemplary embodiment of the present invention.

FIG. 5A illustrates a first block diagram of a coefficient generator used in the communications receiver according to a first exemplary embodiment of the present invention. The coefficient generator 500 includes one or more sets of filter weighting coefficients for use by the interference cancellation filter 304. The coefficient generator 500 determines which set of filter weighting coefficients corresponds with the composition of the interference and/or distortion based upon one or more of the filter coefficient selection signal 356, interference cancellation filter information signal 360, and/or the decoder information signal 362. The coefficient generator may provide a respective set of filter weighting coefficients from the one or more sets of filter weighting coefficients that corresponds with the composition of the interference and/or distortion as the filter weighting coefficients 358. The coefficient generator 500 may represent an exemplary embodiment of the coefficient generator 310.

The coefficient generator 500 includes L filter coefficient updaters 502.1 through 502.L. Each of the filter coefficient updaters 502.1 through 502.L includes a corresponding set of filter coefficients from one or more sets of filter weighting coefficients. The corresponding set of the filter coefficients may be used to compensate for the interference and/or distortion impressed upon the transmitted communications signal 152 in the presence of corresponding time-varying conditions from among the one or more time-varying conditions. For example, the filter coefficients to compensate for the absence of the first time-varying condition and the second time-varying condition may be included within the filter coefficient updater 502.1. The noise analyzer 308 provides the filter coefficient selection signal 356 indicative of the absence of the first time-varying condition and the second time-varying condition. In response to the filter coefficient selection signal 356, the filter coefficient updater 502.1 provides the filter coefficients stored in the filter coefficient updater 502.1 as the filter weighting coefficients 358.

Likewise, the filter coefficients to compensate for the first time-varying condition may included within the filter coefficient updater 502.2. The noise analyzer 308 provides the filter coefficient selection signal 356 indicative of the presence of the first time-varying condition. In response to the filter coefficient selection signal 356, the filter coefficient updater 502.2 provides the filter coefficients stored in the filter coefficient updater 502.2 as the filter weighting coefficients 358.

Similarly, the filter coefficients to compensate for the second time-varying condition may included within the filter coefficient updater 502.3. The noise analyzer 308 provides the filter coefficient selection signal 356 indicative of the presence of the second time-varying condition. In response to the filter coefficient selection signal 356, the filter coefficient updater 502.3 provides the filter coefficients stored in the filter coefficient updater 502.3 as the filter weighting coefficients 358.

Likewise, the filter coefficients to compensate for the first time-varying condition and the second time-varying condition may included within the filter coefficient updater 502.4. The noise analyzer 308 provides the filter coefficient selection signal 356 indicative of the presence of the first time-varying condition and the second time-varying condition. In response to the filter coefficient selection signal 356, the filter coefficient updater 502.3 provides the filter coefficients stored in the filter coefficient updater 502.3 as the filter weighting coefficients 358.

The filter coefficient updaters 502.1 through 502.L may additionally train or adapt their corresponding filter coefficients based upon one or more of the filter coefficient selection signal 356, interference cancellation filter information signal 360, and/or the decoder information signal 362. For example, when the filter coefficient selection signal 356 indicates the composition of the interference and/or distortion condition corresponds to the filter coefficients included within the filter coefficient updater 502.1, the filter coefficient updater 502.1 adapts its respective filter coefficients. The filter coefficients included within the remainder of the filter coefficient updaters 502 continue in their current state until selected by the filter coefficient selection signal 356. The filter coefficient updaters 502.1 through 502.L may use one or more of the modified sequence of data 354, the interference cancellation filter information signal 360, and the decoder information signal 362 to update their respective filter coefficients through a weight computation algorithm as described in U.S. patent application Ser. No. 09/878,730, filed Jun. 11, 2001, entitled "System and Method for Canceling Interference in a Communications System," now U.S. Pat. No. 6,798,854, which is incorporated herein by reference in its entirety.

Figure 5B:
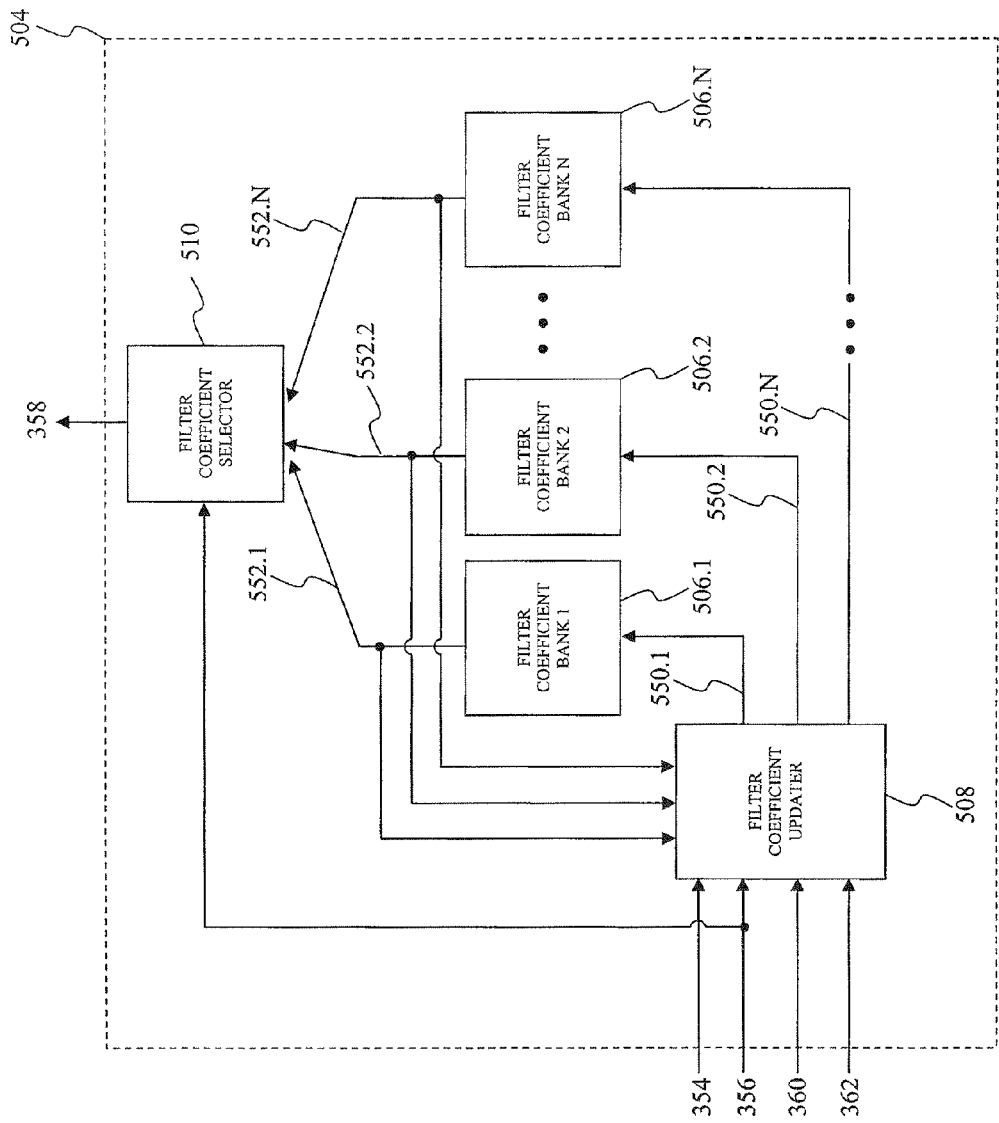
FIG. 5B illustrates a second block diagram of the coefficient generator used in the communications receiver according to a second exemplary embodiment of the present invention.

FIG. 5B illustrates a second block diagram of the coefficient generator used in the communications receiver according to a second exemplary embodiment of the present invention. The coefficient generator 504 includes one or more sets of filter weighting coefficients for use by the interference cancellation filter 304. The coefficient generator 504 determines which set of filter weighting coefficients corresponds with the composition of the interference and/or distortion based upon one or more of the filter coefficient selection signal 356, interference cancellation filter information signal 360, and/or the decoder information signal 362. The coefficient generator may provide a respective set of filter weighting coefficients from the one or more sets of filter weighting coefficients that corresponds with the composition of the interference and/or distortion as the filter weighting coefficients 358. The coefficient generator 504 may represent an exemplary embodiment of the coefficient generator 310.

The coefficient generator 504 includes filter coefficient banks 506.1 through 506.L, a filter coefficient selector 510, and a filter coefficient updater 508. The filter coefficient banks 506.1 through 506.L provide filter coefficients 552.1 through 552.L based upon updated filter coefficients 550.1 through 550.L. More specifically, each one of the filter coefficient banks 506.1 through 506.L receives a respective one of the one or more sets of filter weighting coefficients via a corresponding updated filter coefficient 550.1 through 550.L. Each one of the filter coefficient banks 506.1 through 506.L then provides the respective one of the one or more sets of filter weighting coefficients to a corresponding filter coefficient 552.1 through 552.L.

The corresponding set of the filter coefficients may be used to compensate for the interference and/or distortion impressed upon the transmitted communications signal 152 in the presence of a corresponding of time-varying conditions from among the one or more time-varying conditions. For example, the filter coefficients to compensate for:

1. the absence of the first time-varying condition and the second time-varying condition may be included within the filter coefficient bank 506.1;

2. the first time-varying condition may be included within the filter coefficient bank 506.2;

3. the second time-varying condition may be included within the filter coefficient bank 506.3; and/or 4. the first time-varying condition and the second time-varying condition may be included within the filter coefficient bank 506.4.

However, these examples are not limiting, those skilled in the relevant art(s) will recognize that the filter coefficients used to compensate for more or less time-varying conditions may be included within the filter coefficient banks 506.1 through 506.L in accordance with the teachings herein without departing from the spirit and scope of the present invention.

The filter coefficient updater 508 may train or adapt one or more sets of filter weighting coefficients. The filter coefficient updater 508 may provide the updated filter coefficients 550.1 through 550.L to the filter coefficient banks 506.1 through 506.L. For example, when the one or more of the filter coefficient selection signal 356, interference cancellation filter information signal 360, and/or the decoder information signal 362 indicates the composition of the interference and/or distortion condition corresponds to the filter coefficients included within the filter coefficient bank 506.1, the filter coefficient updater 508 selects the filter coefficient 552.1 corresponding to the filter coefficient bank 506.1. The filter coefficient updater 508 then adapts the filter coefficient 552.1. The filter coefficients 552.2 through 552.L continue in their current state until selected by the filter coefficient selection signal 356. The filter coefficient updater 508 then provides the updated filter coefficient 550.1 to the filter coefficient bank 506. The filter coefficient updater 508 may use one or more of the modified sequence of data 354, the interference cancellation filter information signal 360, and the decoder information signal 362 to update the filter coefficients 552.1 through 552.L through a weight computation algorithm as described in U.S. patent application Ser. No. 09/878,730, filed Jun. 11, 2001, entitled "System and Method for Canceling Interference in a Communications System," now U.S. Pat. No. 6,798, 854, which is incorporated herein by reference in its entirety.

The filter coefficient selector 510 selects a corresponding one of the filter coefficients 552.1 through 552.L based on the filter coefficient selection signal 356 to provide the filter weighting coefficients 358. For example, when the filter coefficient selection signal 356 indicates the composition of the interference and/or distortion condition corresponds to the filter coefficients provided by the filter coefficient bank 506.1, the filter coefficient selector 510 may select the filter coefficient 552.1 as the filter weighting coefficients 358.

First Exemplary Embodiment of the Interference Cancellation Filter

From the discussion above, the transmitted communications signal 152 may include active signaling dimensions, such as active timeslots to provide an example, inactive signaling dimensions, such as inactive timeslots to provide an example, or any combination of active and inactive signaling dimensions. The interference cancellation filter 304 compensates for the interference and/or distortion in the presence of the one or more time-varying conditions embedded in the active time slots of the noisy sequence of data 350 by analyzing the interference and/or distortion in the presence of the one or more time-varying conditions within the inactive time slots or those active time slots that are, in effect, inactive time slots.

Figure 6:
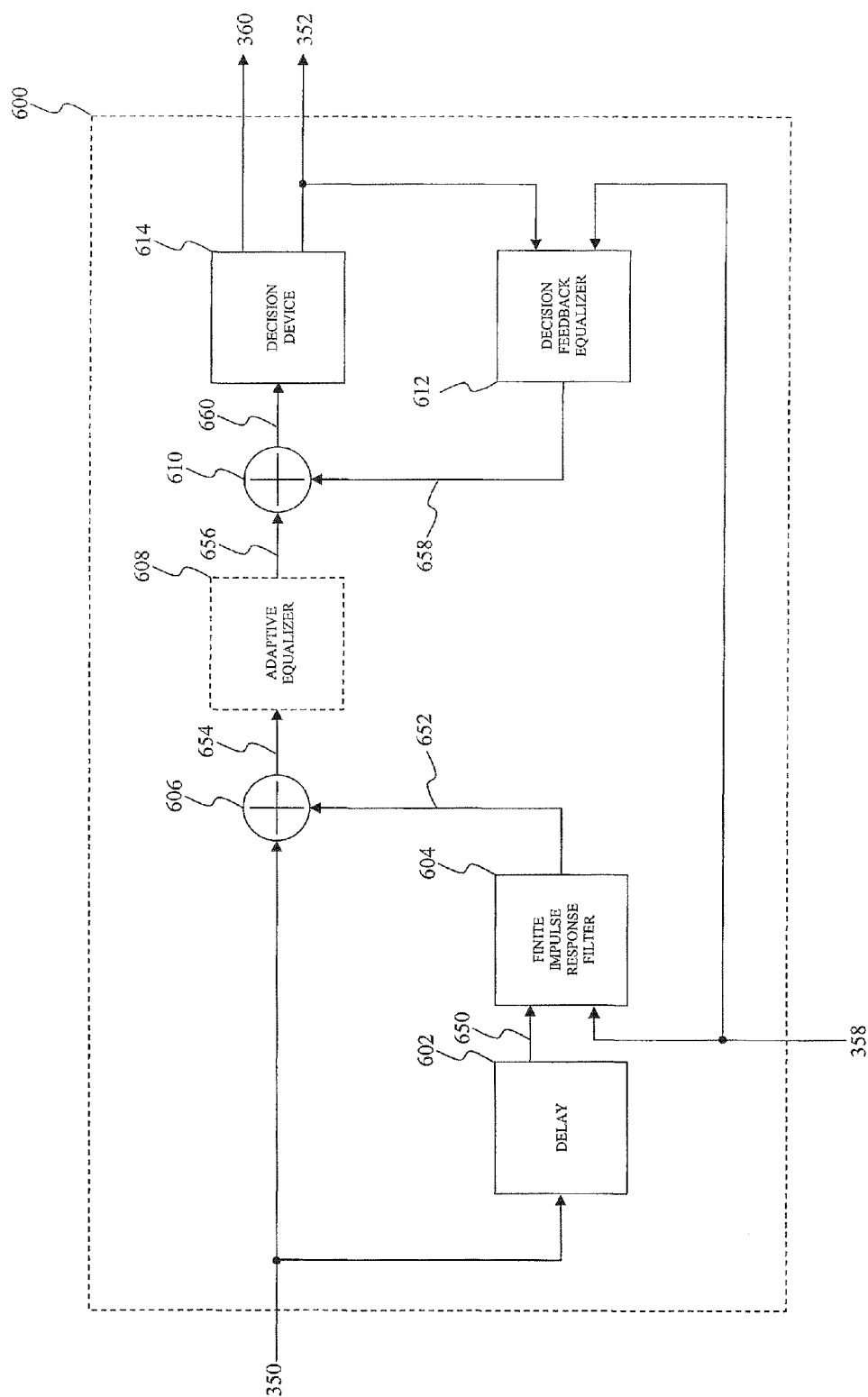
FIG. 6 illustrates a first block diagram of an interference cancellation filter used in the communications receiver according to a first exemplary embodiment of the present invention.

FIG. 6 illustrates a first block diagram of an interference cancellation filter used in the communications receiver according to a first exemplary embodiment of the present invention. An interference cancellation filter 600 compensates for the interference and/or distortion in the presence of the one or more time-varying conditions embedded in the noisy sequence of data 350 to provide the noise compensated sequence of data 352. The interference cancellation filter 600 may represent an exemplary embodiment of the interference cancellation filter 304.

The interference cancellation filter 600 includes a delay module 602, a finite impulse response (FIR) filter 604, a summation module 606, an adaptive equalizer 608, a summation module 610, a decision feedback equalizer (DFE) 612, and a decision device 614. The delay module 602 delays the noisy sequence of data 350 by one or more samples to provide a delayed noisy sequence of data 650. In an exemplary embodiment, the delay module 602 delays the noisy sequence of data 350 by a unit delay of one sample.

The finite impulse response (FIR) filter 604 provides a filtered sequence of data 652 based upon the delayed noisy sequence of data 650. The FIR filter 604 adaptively adjusts an impulse response based upon the filter weighting coefficients 358 to compensate for the interference and/or distortion embedded in the delayed noisy sequence of data 650 in the presence of the one or more time-varying conditions. More specifically, the FIR filter 604 is implemented using one or more taps, each tap including one or more delays coupled to a corresponding multiplier from a plurality of multipliers. The filter weighting coefficients 358 are used to assign weights to the one or more taps of the FIR filter 604 to adjust the impulse response. The summation module 606 combines the noisy sequence of data 350 and the filtered sequence of data 652 to provide an attenuated sequence of data 654.

The adaptive equalizer 608 further attenuates the interference and/or distortion in the presence of the one or more time-varying conditions to provide a feed forward equalized sequence of data 656. The adaptive equalizer 608 adaptively adjusts an impulse response according to internal equalization coefficients. The internal equalization coefficients for the adaptive equalizer 608 are updated with a least-squares algorithm, such as the widely known Least Mean Squared (LMS), Recursive Least Squares (RLS), Minimum Mean Squared Error (MMSE) algorithms or any suitable equivalent algorithm that yields a least-squares result. In other words, the least-squares algorithm or the suitable equivalent may train the adaptive equalizer 608 to allow the adaptive equalizer 608 to further attenuate the interference and/or distortion within the attenuated sequence of data 654 in the presence of the one or more time-varying conditions. The adaptive equalizer 608 may be implemented as, but is not limited to, a decision feedback equalizer (DFE), a feed forward equalizer (FFE), any suitable interference cancellation circuit, a concatenation of an interference cancellation circuit and/or adaptive equalizer, and/or any combination thereof. In an exemplary embodiment, the adaptive equalizer 608 is optional. In this embodiment, the summation module 606 may directly provide the attenuated sequence of data 654 to the summation module 610.

The summation module 610 combines the feed forward equalized sequence of data 656 and a decision feedback equalized sequence of data 658 to provide an equalized sequence of data 660. The decision feedback equalizer (DFE) 612 provides the decision feedback equalized sequence of data 658 based upon the noise compensated sequence of data 352. The DFE 612 adaptively adjusts an impulse response based upon the filter weighting coefficients 358 to further compensate for the interference and/or distortion embedded in the noise compensated sequence of data 352 in the presence of the one or more time-varying conditions. The filter weighting coefficients 358 may be used to adjust the impulse response by assigning weights to one or more taps of the DFE 612.

The decision device 614 determines the most-likely transmitted sequence of modulation symbols of the transmitted communications signal 152, commonly referred to as decisions, based on the equalized sequence of data 660 to provide the noise compensated sequence of data 352. The noise compensated sequence of data 352 may include a hard decision or a soft decision. The decision device 614 compares the equalized sequence of data 660 to a threshold and assigns a digital value based on the comparison to provide the hard decision. Alternatively, the decision device 614 may incorporate other information, such as a slicer error, a bit error ratio (BER) estimate, a symbol error ratio (SER) estimate, a signal to noise ratio (SNR) or any other suitable signal parameter into the hard decision to provide the soft decision. The decision device 614 provides the interference cancellation filter information signal 360 based on the equalized sequence of data 660. The interference cancellation filter information signal 360 may include signal parameters such as a slicer error, a bit error rate (BER), a symbol error rate (SER), a signal to noise ratio (SNR) or any other suitable signal parameter that will be apparent to those skilled in the relevant art(s).

This embodiment of the interference cancellation filter 600 is further described in U.S. patent application Ser. No. 09/878,730, filed Jun. 11, 2001, entitled "System and Method for Canceling Interference in a Communications System," now U.S. Pat. No. 6,798,854, which is incorporated herein by reference in its entirety.

Despreading of Signaling Dimensions

Alternatively, the transmitted communications signal 152 may include active signaling dimensions, inactive signaling dimensions, or any combination of active and inactive signaling dimensions. The interference cancellation filter 304 compensates for the interference and/or distortion in the presence of the one or more time-varying conditions embedded in the active signaling dimensions of the noisy sequence of data 350 by analyzing the interference and/or distortion in the presence of the one or more time-varying conditions within the inactive signaling dimensions or those active signaling dimensions that are, in effect, inactive signaling dimensions.

The compensation of the interference and/or distortion in the presence of the one or more time-varying conditions embedded in the active signaling dimensions, such as the active orthogonal codes to provide an example, includes matched filtering of the inactive signaling dimensions and/or active signaling dimensions of the noisy sequence of data 350. This matched filtering of the inactive signaling dimensions and/or active signaling dimensions is referred to as vector despreading or simply despreading. Vector despreading represents a process of separating a combined communication signal having the inactive signaling dimensions and/or the active signaling dimensions into separate communications signals, each of the separate communications signals representative of one of the inactive signaling dimensions and/or the active signaling dimensions.

Figure 7A:
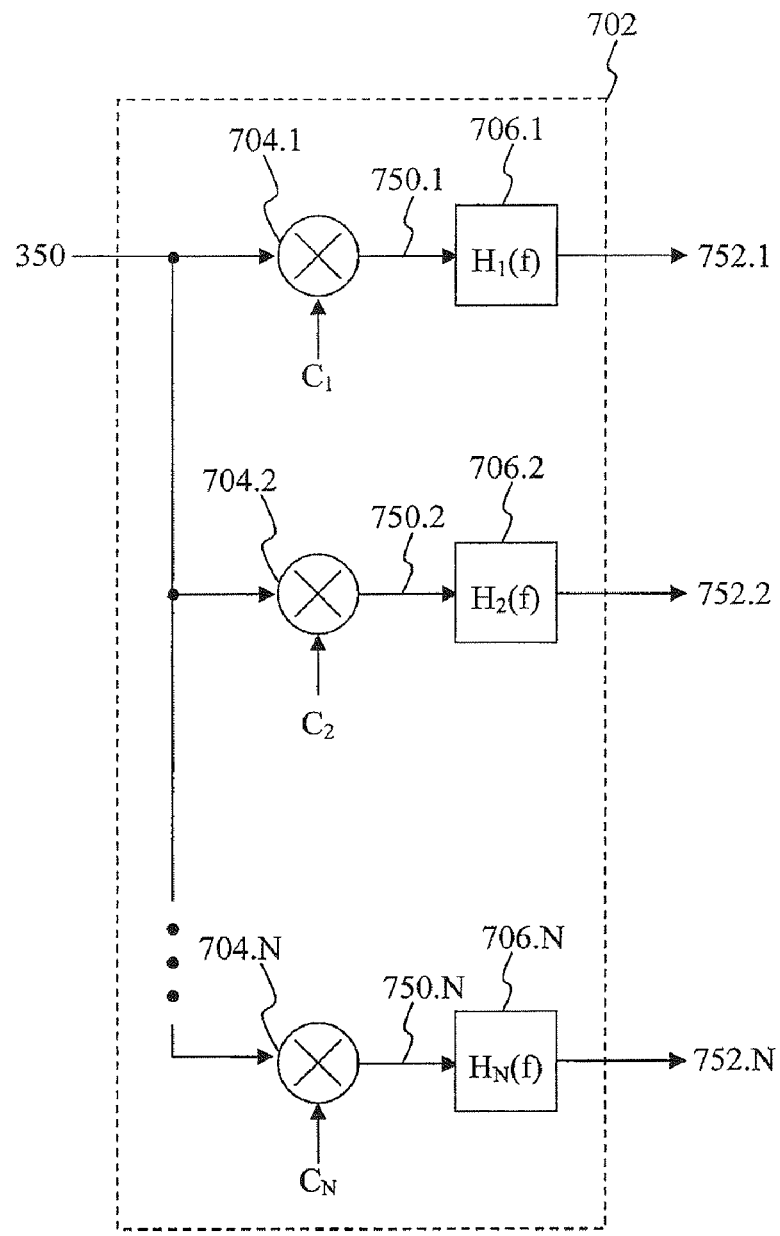
FIG. 7A illustrates a first block diagram of a vector despreading module used in the interference cancellation filter according to a first exemplary embodiment of the present invention.

FIG. 7A illustrates a first block diagram of a vector despreading module used in the interference cancellation filter according to a first exemplary embodiment of the present invention. A vector despreader 702 decomposes or separates the one or more signaling dimensions of the noisy sequence of data 350 into signaling dimensions, or components, 750.1 through 750.N. More specifically, the noisy sequence of data 350 represents a combined sequence of data including at least one signaling dimension, such as at least one of the inactive signaling dimensions and/or the active signaling dimensions. The vector despreader 702 separates or decomposes each of the combined signaling dimensions of the noisy sequence of data 350 into its respective signaling dimension, or component, 750.1 through 750.N.

The vector despreader 702 includes matched filter modules 704.1 through 704.N. The matched filter modules 704.1 through 704.N filter at least one signaling dimension from the noisy sequence of data 350 using a corresponding transfer function $H_1(f)$ through $H_N(f)$ to provide a corresponding one of the signaling dimensions, or components, 750.1 through 750.N. The transfer functions $H_1(f)$ through $H_N(f)$ effectively separate or isolate the at least one signaling dimension, or component, from within the combined signaling dimensions 750.1 through 750.N.

Despreading of Orthogonal Codes

As an example, the transmitted communications signal 152 may include active orthogonal spreading codes, inactive orthogonal spreading codes, or any combination of active and inactive orthogonal spreading codes. Orthogonal spreading codes may also be referred to as orthogonal codes. The interference cancellation filter 304 compensates for the interference and/or distortion in the presence of the one or more time-varying conditions embedded in the active orthogonal codes of the noisy sequence of data 350 by analyzing the interference and/or distortion in the presence of the one or more time-varying conditions within the inactive orthogonal codes or those active orthogonal codes that are, in effect, inactive orthogonal codes. The compensation of the interference and/or distortion in the presence of the one or more time-varying conditions embedded in the active orthogonal codes requires decomposition of noisy sequence of data 350 into its distinct inactive orthogonal codes and/or active orthogonal codes.

Figure 7B:
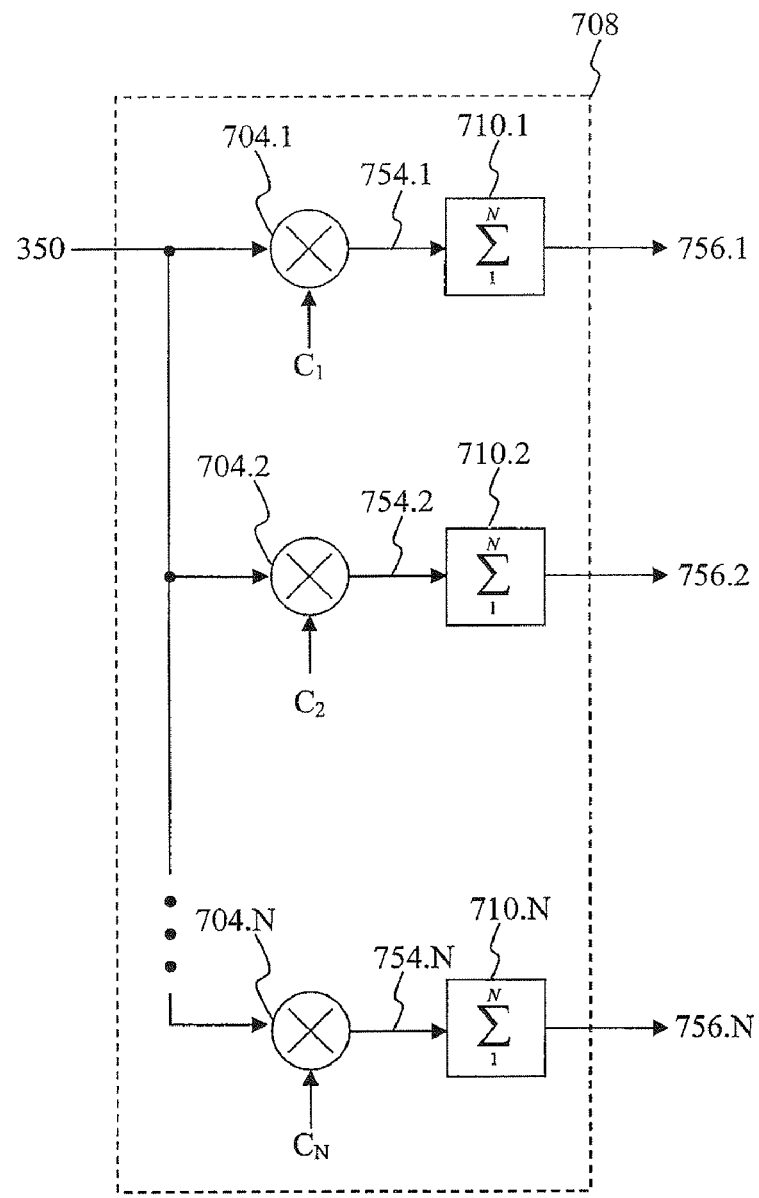
FIG. 7B illustrates a second block diagram of a vector despreading module used in the interference cancellation filter according to a second exemplary embodiment of the present invention.

FIG. 7B illustrates a second block diagram of a vector despreading module used in the interference cancellation filter according to a second exemplary embodiment of the present invention. A vector despreader 708 decomposes or separates the one or more orthogonal codes comprising the noisy sequence of data 350 into the orthogonal code components 756.1 through 756.N. More specifically, the noisy sequence of data 350 represents a combined sequence of data including at least one orthogonal code, such as at least one of the inactive orthogonal codes and/or the active orthogonal codes. The vector despreader 708 separates or isolates each of the orthogonal codes of the noisy sequence of data 350 into its respective orthogonal code, or component or dimension, 756.1 through 756.N. While the operation of despreading produces a relative value (or component value) corresponding to each spreading code comprising the composite signal, hereafter the produced component value may be referred to with shortened nomenclature as the "signaling dimension", or "spreading code", or "orthogonal code" itself, instead of referring to the despread value in its literal sense as the relative (signed) size or value of the dimension or code which was generated or isolated by the despreading, and which is the actual component. In other words, the operation of despreading generates a set of components corresponding to the constituent dimensions, but this will be referred to as despreading and producing the dimensions themselves.

The vector despreader 708 includes multipliers 704.1 through 704.N and summation modules 710.1 through 710.N. The multipliers 704.1 through 704.N multiply the noisy sequence of data 350 by despreading signaling sequences $C_1$ through $C_N$ to wipeoff the spreading. The summation modules 708.1 through 708.N combine the N chips of each of the orthogonal codes 754.1 through 754.N to provide the matched filtered, decomposed or isolated or separated orthogonal code components 756.1 through 756.N.

Second Exemplary Embodiment of the Interference Cancellation Filter

Figure 8A:
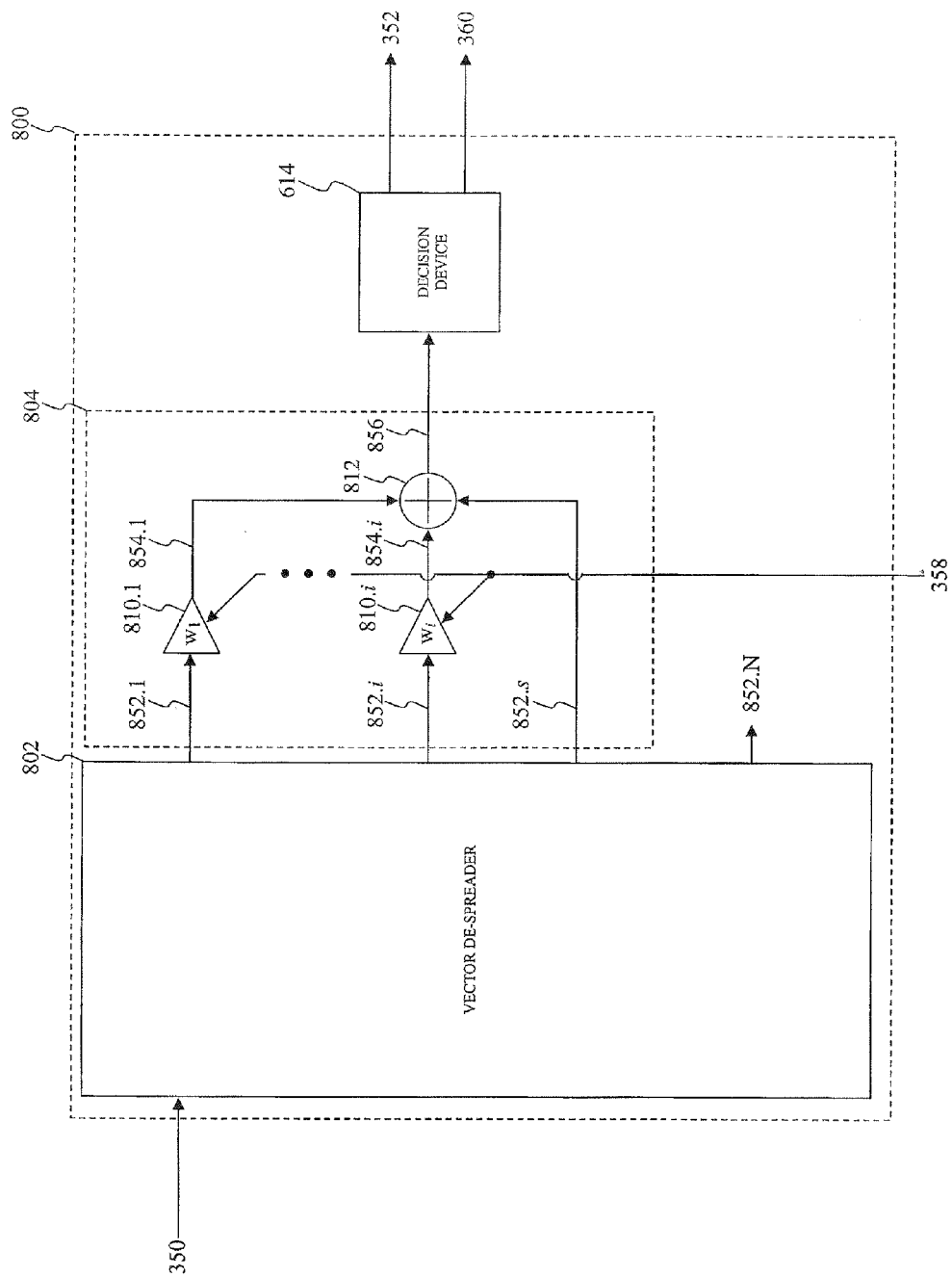
FIG. 8A illustrates a second block diagram of the interference cancellation filter used in the communications receiver according to a second exemplary embodiment of the present invention.

FIG. 8A illustrates a second block diagram of the interference cancellation filter used in the communications receiver according to a second exemplary embodiment of the present invention. An interference cancellation filter 800 may compensate for the interference and/or distortion in the presence of the one or more time-varying conditions embedded in the noisy sequence of data 350 to provide the noise compensated sequence of data 352. The interference cancellation filter 800 may represent an exemplary embodiment of the interference cancellation filter 304.

The interference cancellation filter 800 includes a vector despreader 802, a linear combination module 804, and the decision device 614. The vector despreader 802 separates or decomposes the noisy sequence of data 350 into signaling dimension components 852.1 through 852.N. From the discussion above, the noisy sequence of data 350 includes at least one signaling dimension of which may include the inactive signaling dimensions and/or the active signaling dimensions. The vector despreader 802 separates each of the signaling dimensions of the noisy sequence of data 350 into a corresponding one of the signaling dimensions 852.1 through 852.N. The signaling dimensions 852.1 through 852.i may represent the inactive signaling dimensions, whereas the signaling dimensions 852.(i+1) through 852.N represent the inactive signaling dimensions.

The vector despreader 802 may represent an exemplary embodiment of the vector despreader 702 as discussed in FIG. 7A or the vector despreader 708 as discuss in FIG. 7B. As such, the signaling dimension components 852.1 through 852.N may represent either the signaling dimensions 750.1 through 750.N as discussed in FIG. 7A or the orthogonal codes 756.1 through 756.N as discussed in FIG. 7B.

The linear combination module 804 may compensate for the interference and/or distortion in the presence and/or absence of the one or more time-varying conditions in one of the signaling dimensions 852.1 through 852.N, denoted as the signaling dimension 852.s in FIG. 8A. The signaling dimension 852.s may correspond to one of the active signaling dimensions of the noisy sequence of data 350. Alternatively, the signaling dimension 852.s may correspond to one of the inactive signaling dimensions of the noisy sequence of data 350. As shown in FIG. 8A, the linear combination module 804 includes scaling modules 810.1 through 810.i and a summation module 812. The scaling modules 810.1 through 810.i scale the signaling dimensions 852.1 through 852.i, corresponding to the inactive signaling dimensions, by weighting coefficients $w_1$ through $w_i$ to provide weighted signaling dimensions 854.1 through 854.i. The weighting coefficients $w_1$ through $w_i$ may be provided to the linear combination module 804 by the coefficient generator 310 via the filter weighting coefficients 358 in a similar manner as discussed above. The summation module 812 combines the weighted signaling dimensions 854.1 through 854.i and the signaling dimension 852.s to provide the signaling dimension 856. The signaling dimension 856 includes the signaling dimension 852.s having a reduction in interference and/or distortion in the presence of the one or more time-varying conditions.

The decision device 614 provides decisions and/or the interference cancellation filter information signal 360 based on the signaling dimension 856 to provide the noise compensated sequence of data 352 in a similar manner as discussed above.

The interference cancellation filter 800 is further described in U.S. patent application Ser. No. 10/142,189, filed May 8, 2002, entitled "Cancellation of Interference in a Communication System with Application to S-CDMA," now U.S. Pat. No. 7,110,434, which is incorporated herein by reference in its entirety.

Figure 8B:
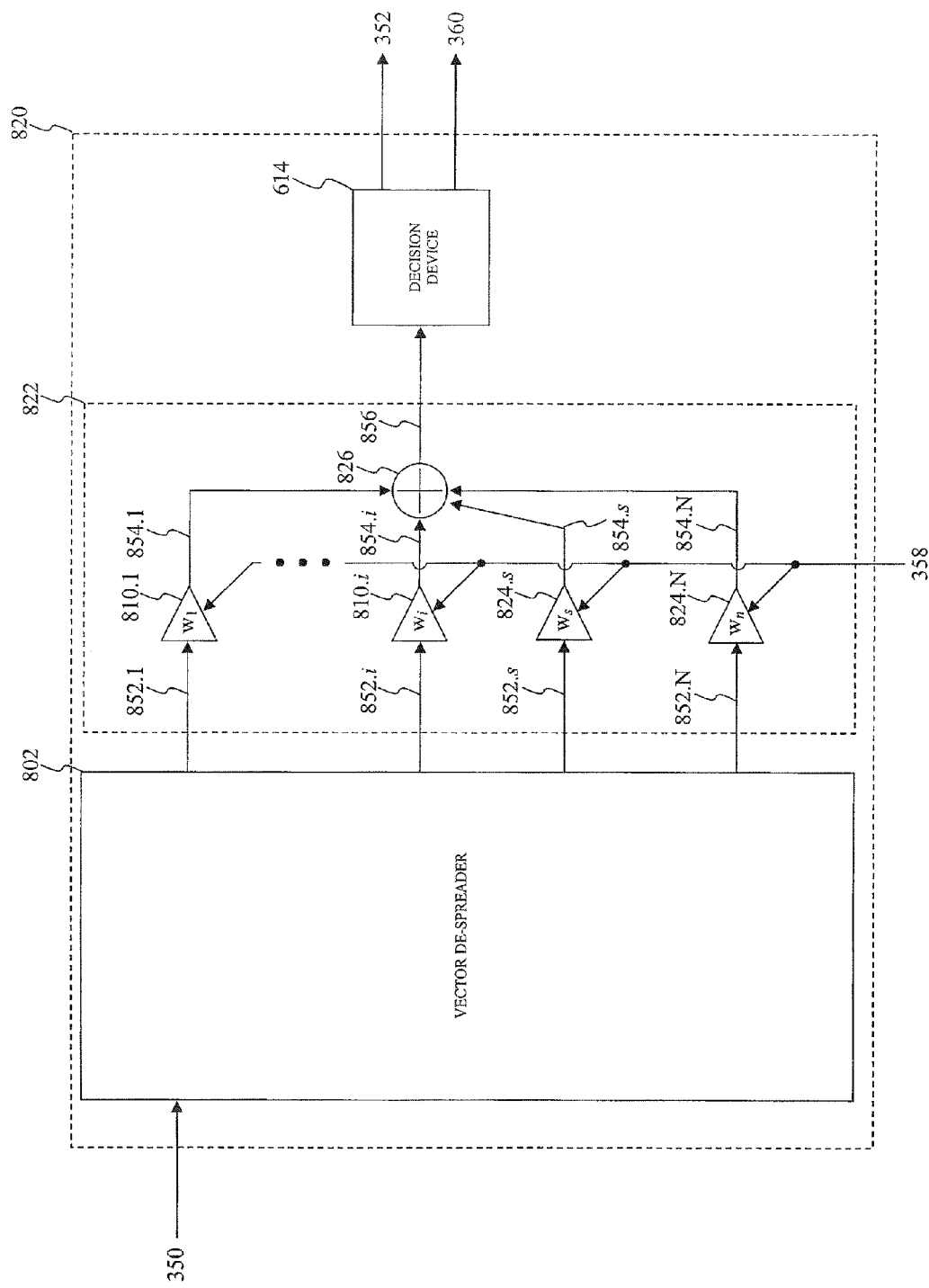
FIG. 8B illustrates a third block diagram of the interference cancellation filter used in the communications receiver according to a third exemplary embodiment of the present invention.

FIG. 8B illustrates a third block diagram of the interference cancellation filter used in the communications receiver according to a third exemplary embodiment of the present invention. An interference cancellation filter 820 may compensate for the interference and/or distortion in the presence of the one or more time-varying conditions embedded in the noisy sequence of data 350 to provide the noise compensated sequence of data 352. The interference cancellation filter 820 may represent an exemplary embodiment of the interference cancellation filter 304.

The interference cancellation filter 820 includes the vector despreader 802 and a linear combination module 822. The vector despreader 802 separates the noisy sequence of data 350 into signaling dimensions 852.1 through 852.N in a substantially similar manner as discussed above. The signaling dimensions 852.1 through 852.i may represent the inactive signaling dimensions, whereas the signaling dimensions 852.(i+1) through 852.N represent the inactive signaling dimensions.

The linear combination module 822 may compensate for the interference and/or distortion in the presence and/or absence of the one or more time-varying conditions in one of the signaling dimensions 852.1 through 852.N, denoted as the signaling dimension 852.s in FIG. 8B. The signaling dimension 852.s may correspond to one of the active signaling dimensions of the noisy sequence of data 350. Alternatively, the signaling dimension 852.s may correspond to one of the inactive signaling dimensions of the noisy sequence of data 350. As shown in FIG. 8B, the linear combination module 822 includes the scaling modules 810.1 through 810.i, scaling modules 824.s through 824.N, and a summation module 826. The scaling modules 810.1 through 810.i scale the signaling dimensions 852.1 through 852.i, corresponding to the inactive signaling dimensions, by weighting coefficients $w_1$ through $w_i$ to provide weighted signaling dimensions 854.1 through 854.i in a similar manner as discussed above. The scaling modules 824.1 through 824.i scale the signaling dimensions 852.(i+1) through 852.N, corresponding to the active signaling dimensions, by weighting coefficients $w_{i+1}$) through $w_N$ to provide weighted signaling dimensions 854.(i+1) through 854.N. The weighting coefficients $w_{(i+1)}$ through $W_N$ may be provided to the linear combination module 822 by the coefficient generator 310 via the filter weighting coefficients 358 in a similar manner as discussed above.

The summation module 812 combines the weighted signaling dimension components 854.1 through 854.N to provide one of the signaling dimensions combined in the noisy sequence of data 350 as the signaling dimension 856. The decision device 614 provides decisions and/or the interference cancellation filter information signal 360 based on the signaling dimension component 856 to provide the noise compensated sequence of data 352 in a similar manner as discussed above.

The interference cancellation filter 820 is further described in U.S. patent application Ser. No. 10/142,189, filed May 8, 2002, entitled "Cancellation of Interference in a Communication System with Application to S-CDMA," now U.S. Pat. No. 7,110,434, which is incorporated herein by reference in its entirety.

Figure 8C:
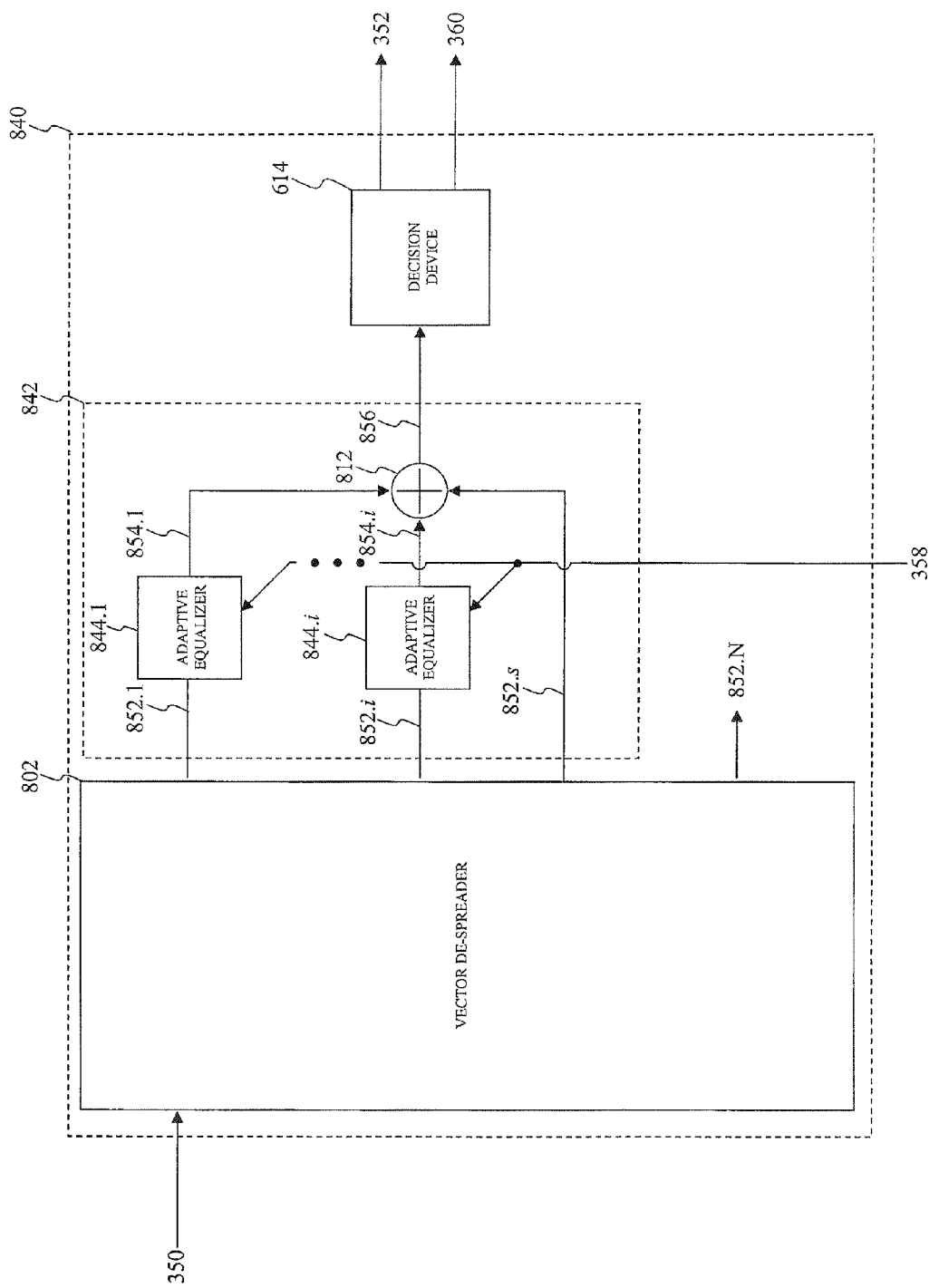
FIG. 8C illustrates a fourth block diagram of the interference cancellation filter used in the communications receiver according to a fourth exemplary embodiment of the present invention.

FIG. 8C illustrates a fourth block diagram of the interference cancellation filter used in the communications receiver according to a fourth exemplary embodiment of the present invention. An interference cancellation filter 840 may compensate for the interference and/or distortion in the presence of the one or more time-varying conditions embedded in the noisy sequence of data 350 to provide the noise compensated sequence of data 352.

The interference cancellation filter 840 may represent an exemplary embodiment of the interference cancellation filter 304.

The interference cancellation filter 840 includes the vector despreader 802 and a linear combination module 822. The vector despreader 802 separates the noisy sequence of data 350 into signaling dimensions 852.1 through 852.N in a substantially similar manner as discussed above. The signaling dimensions 852.1 through 852.i may represent the inactive signaling dimensions, whereas the signaling dimensions 852.(i+1) through 852.N represent the inactive signaling dimensions.

The linear combination module 842 may compensate for the interference and/or distortion in the presence and/or absence of the one or more time-varying conditions in one of the signaling dimensions 852.1 through 852.N, denoted as the signaling dimension 852.s in FIG. 8C. The signaling dimension 852.s may correspond to one of the active signaling dimensions of the noisy sequence of data 350. Alternatively, the signaling dimension 852.s may correspond to one of the inactive signaling dimensions of the noisy sequence of data 350.

As shown in FIG. 8C, the linear combination module 842 includes adaptive equalizers 844.1 through 844.i and the summation module 812. Each of the adaptive equalizers 844.1 through 844.i adaptively adjusts its respective impulse response according to one or more sets of equalization coefficients to provide weighted signaling dimensions 854.1 through 854.i. The one or more sets of equalization coefficients may be provided to the linear combination module 842 by the coefficient generator 310 via the filter weighting coefficients 358 in a similar manner as discussed above. Each of the adaptive equalizers 844.1 through 844.i may be implemented as, but is not limited to, a decision feedback equalizer (DFE), a feed forward equalizer (FFE), any suitable interference cancellation circuit, a concatenation of an interference cancellation circuit and/or adaptive equalizer, and/or any combination thereof.

The summation module 812 combines the weighted signaling dimensions 854.1 through 854.i to provide the despread code 856.

The decision device 614 provides the noise compensated sequence of data 352 and/or the interference cancellation filter information signal 360 based on the signaling dimension 856 in a similar manner as discussed above.

The interference cancellation filter 840 is further described in U.S. patent application Ser. No. 10/142,189, filed May 8, 2002, entitled "Cancellation of Interference in a Communication System with Application to S-CDMA," now U.S. Pat. No. 7,110,434, which is incorporated herein by reference in its entirety.

Although not shown in FIG. 8A through FIG. 8C, a substantially similar linear combiner structure may be applied to the other active and/or inactive signaling dimensions as well. In each case, the desired code is applied to the respective linear combination module to compensate for the interference and/or distortion in the presence and/or absence of the one or more time-varying conditions from that code. For each active code, the same i inactive signaling dimensions are summed with the desired code, but for each active code the weighting coefficients $w_1$ through $w_i$ are in general unique. Likewise, for each inactive code, the same (i−1) inactive signaling dimensions are summed with the desired code, but for each active code the weighting coefficients $w_1$ through $w_{(i-1)}$ are in general unique.

Second Exemplary Communications Receiver

Figure 9:
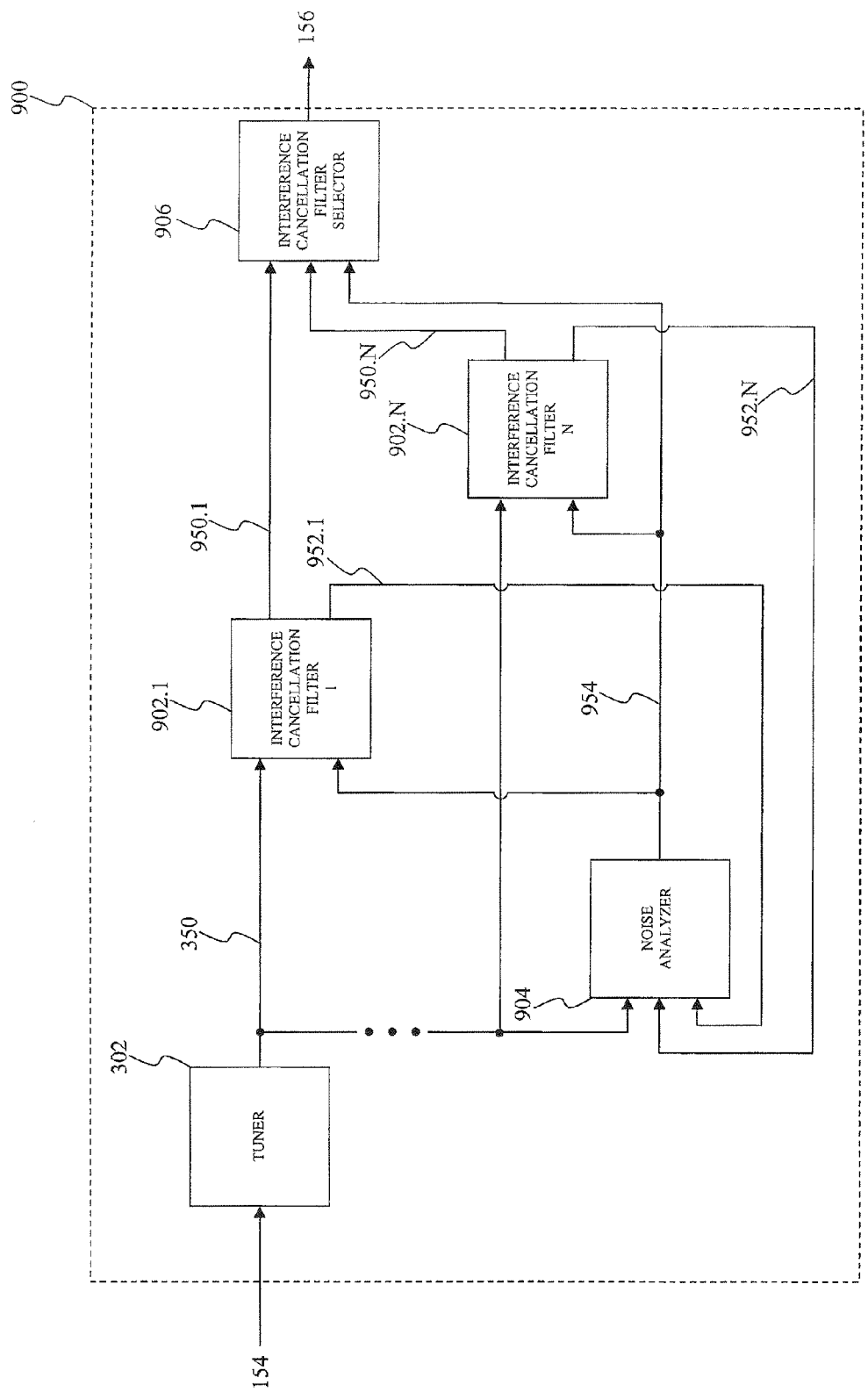
FIG. 9 illustrates a second block diagram of the communications receiver used in the communications environment according to a second exemplary embodiment of the present invention.

FIG. 9 illustrates a second block diagram of the communications receiver used in the communications environment according to a second exemplary embodiment of the present invention. A communications receiver 300 observes the received communications signal 154 as it passes through the communications channel 104. The communications receiver 900 may represent an exemplary embodiment of the communications receiver 106. The communications receiver 900 operates in a substantially similar manner as the communications receiver 300, thus only differences between the communications receiver 900 and the communications receiver 300 are to be described in further detail.

The interference cancellation filters 902.1 through 902.M compensate for the interference and/or distortion in the presence of the one or more time-varying conditions embedded in the active signaling dimensions of the noisy sequence of data 350 to provide noise compensated sequences of data 950.1 through 950.M. More specifically, the interference cancellation filters 902.1 through 902.M compensate for the interference and/or distortion in:

1. the absence of the first time-varying condition and the second time-varying condition using a first one of the interference cancellation filters 902.1 through 902.M;

2. the presence of the first time-varying condition using a second one of the interference cancellation filters 902.1 through 902.M;

3. the presence of the second time-varying condition using a third one of the interference cancellation filters 902.1 through 902.M; and/or 4. the presence of the first time-varying condition and the second time-varying condition using a fourth one of the interference cancellation filters 902.1 through 902.M.

However, these examples are not limiting, those skilled in the relevant art(s) will recognize that the interference cancellation filters 902.1 through 902.M may compensate for the interference and/or distortion in the presence and/or absence of other time-varying conditions in accordance with the teachings herein without departing from the spirit and scope of the present invention.

The interference cancellation filters 902.1 through 902.M then adaptively adjusts its corresponding impulse response based upon one or more sets of filter weighting coefficients to compensate for the interference and/or distortion embedded in the active signaling dimension of the noisy sequence of data 350 in the presence of the one or more time-varying conditions.

The interference cancellation filters 902.1 through 902.M additionally provide interference cancellation filter information signals 952.1 through 952.M based on the active signaling dimension of the noisy sequence of data 350 to the to the noise analyzer 904. The interference cancellation filter information signals 952.1 through 952.M may include signal parameters such as an average power within a bandwidth of the transmitted communications signal 152 over a time interval, a slicer error, a bit error rate (BER), a symbol error rate (SER), a signal to noise ratio (SNR), code information, state information, symbols or bits which are determined to be incorrect or questionable, likely corrected values for such symbols or bits, probabilities for suggested corrections or a multiplicity of possible choices for a correction, likelihood metrics related to estimated signal fidelity corresponding to the noisy sequence of data 350, channel fidelity information as such as disclosed in U.S. patent application Ser. No. 10/000,415, filed Nov. 2, 2001, entitled "Detection and Mitigation of Temporary Impairments in a Communications Channel," now U.S. Pat. No. 7,308,050, which is incorporated herein by reference in its entirety, or any other suitable signal parameter that will be apparent to those skilled in the relevant art(s).

The noise analyzer 904 analyzes the interference and/or distortion impressed onto the inactive signaling dimensions of the noisy sequence of data 350 to provide the interference cancellation filter selection signal 954. The noise analyzer 904 characterizes a composition of the interference and/or distortion embedded within the inactive signaling dimensions of the noisy sequence of data 350 to provide an indication of one or more of the interference cancellation filters 902.1 through 902.M that corresponds with the composition of the interference and/or distortion as the interference cancellation filter selection signal 954. For example, the noise analyzer 904 may characterize the interference and/or distortion embedded within the inactive signaling dimensions of the noisy sequence of data 350 as:

1. not including the first time-varying condition and the second time-varying condition the noise analyzer 904 provides the filter coefficient selection signal 356 indicative of the absence of the first time-varying condition and the second time-varying condition;

2. including the first time-varying condition, the noise analyzer 904 provides the filter coefficient selection signal 356 indicative of the presence of the first time-varying condition;

3. including the second time-varying condition, the noise analyzer 904 provides the filter coefficient selection signal 356 indicative of the presence of the second time-varying condition; and/or 4. including the first time-varying condition and the second time-varying condition, the noise analyzer 904 provides the filter coefficient selection signal 356 indicative of the presence of the first time-varying condition and the second time-varying condition.

However, these examples are not limiting, those skilled in the relevant art(s) will recognize that the noise analyzer 904 may characterize the interference and/or distortion embedded within the inactive signaling dimensions of the noisy sequence of data 350 as other time-varying conditions in accordance with the teachings herein without departing from the spirit and scope of the present invention.

The interference cancellation filter selector 906 selects at least one of the noise compensated sequences of data 950.1 through 950.M to represent the one or more sequences of recovered data 156 based upon the interference cancellation filter selection signal 954. For example, when the interference cancellation filter selection signal 954 indicates interference cancellation filter 902.1 is to compensate for the interference and/or distortion embedded in the noisy sequence of data 350, the interference cancellation filter selector 906 selects the noise compensated sequence of data 950.1 to represent the one or more sequences of recovered data 156.

Figure 10A:
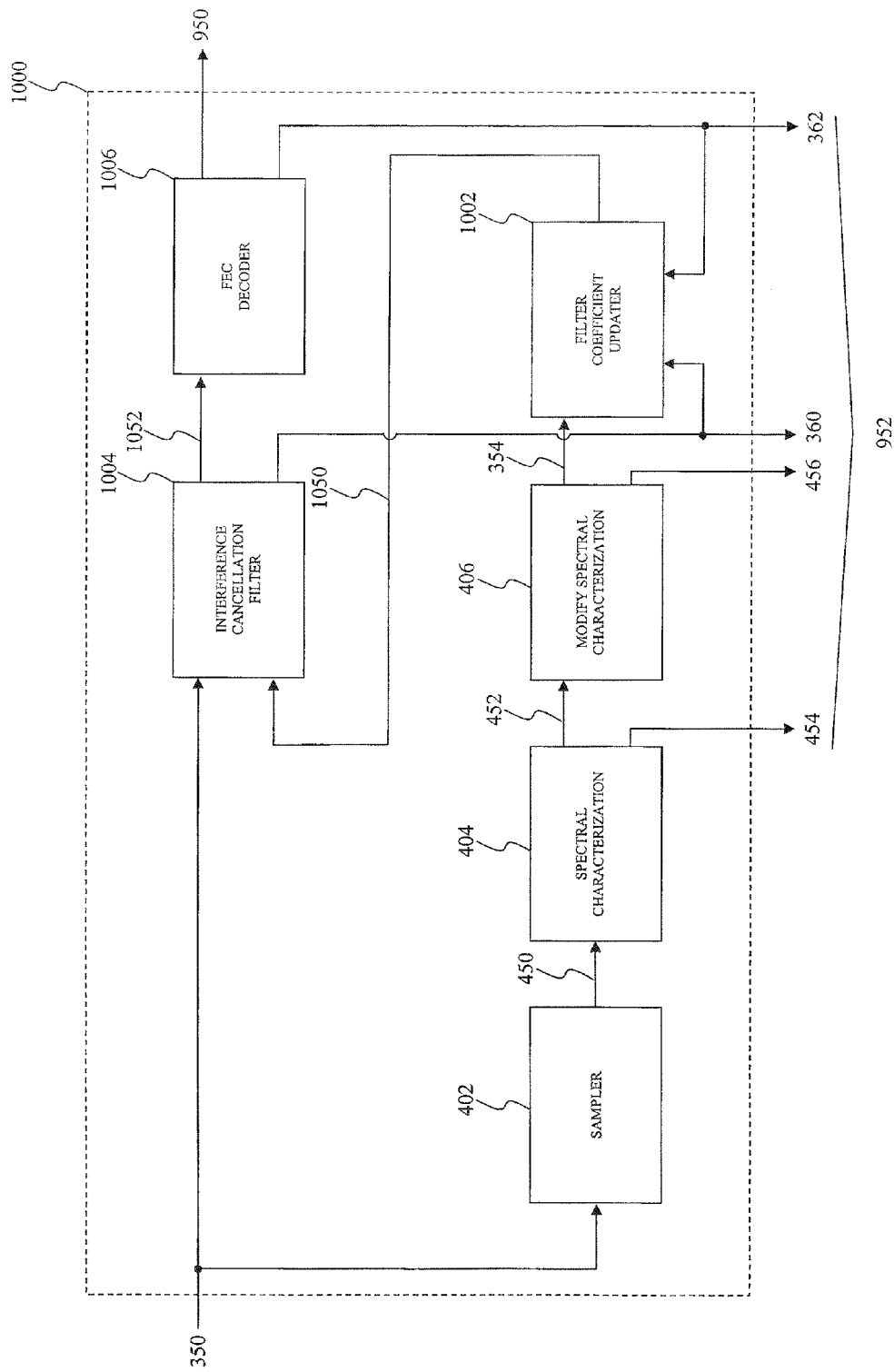
FIG. 10A illustrates a first block diagram of the interference cancellation filter used in the second communications receiver according to a first exemplary embodiment of the present invention.

Interference Cancellation Filter for Signaling Dimensions used in the Second Exemplary Communications Receiver FIG. 10A illustrates a first block diagram of the interference cancellation filter used in the second communications receiver according to a first exemplary embodiment of the present invention. An interference cancellation filter 1000 compensates for the interference and/or distortion in the presence of the one or more time-varying conditions embedded in the active signaling dimension of the noisy sequence of data 350 to provide one of the noise compensated sequences of data 950.1 through 950.M. The interference cancellation filter 1000 then adaptively adjusts its corresponding impulse response based upon one or more sets of filter weighting coefficients to compensate for the interference and/or distortion embedded in the active signaling dimension of the noisy sequence of data 350 in the presence of the one or more time-varying conditions. The interference cancellation filter 1000 may represent an exemplary embodiment of one of the interference cancellation filters 902.1 through 902.M.

The interference cancellation filter 1000 includes the sampling module 402, the spectral characterization module 404, the modify spectral characterization module 406, a filter coefficient updater module 1002, an interference cancellation filter 1004, and a FEC decoder 1006. The sampling module 402 samples the noisy sequence of data 350 to provide the sampled sequence of data 450 in a similar manner as discussed above. Specifically, the noisy sequence of data 350 may include one or more inactive signaling dimensions, one or more active signaling dimensions, or any combination of inactive and active signaling dimensions. However, this example is not limiting as those skilled in relevant art(s) will recognize that the noisy sequence of data 350 may include orthogonal codes, tones, or other signaling dimensions without departing from the spirit and scope of the invention. The sampling module 402 samples one or more of the inactive signaling dimensions and or the active signaling dimensions that are, in effect, inactive signaling dimensions to provide the sampled sequence of data 450.

The spectral characterization module 404 spectrally characterizes the sampled sequence of data 450 to provide the spectral characterization 452. More specifically, the spectral characterization module 404 may spectrally characterize the inactive signaling dimensions to provide the spectral characterization 452 and the spectral characterization information signal 454

The modify spectral characterization module 406 modifies the spectral characterization 452 to provide the modified sequence of data 354 and the modified spectral characterization information signal 456 in a substantially similar manner as discussed above.

The filter coefficient updater module 1002 provides a set of filter coefficients 1050 to the interference cancellation filter 1004. The set of filter coefficients 1050 may be used to compensate for the presence of the one or more time-varying conditions embedded in the noisy sequence of data 350 in a similar manner as the filter coefficient updaters 502.1 through 502.N and/or the filter coefficient updater 508 as discussed above. The filter coefficient updater module 1002 may use one or more of the modified sequence of data 354, the interference cancellation filter information signal 360, and the decoder information signal 362 to update filter coefficients through the weight computation algorithm in a similar manner as the filter coefficient updaters 502.1 through 502.N and/or the filter coefficient updater 508 as discussed above.

The interference cancellation filter 1004 may compensate for the interference and/or distortion in the presence of the one or more time-varying conditions using the set of filter coefficients 1050 embedded in the noisy sequence of data 350 to provide a noise compensated sequence of data 1064. The interference cancellation filter 1004 may provide the interference cancellation filter information signal 1066 based the noisy sequence of data 350 in a similar manner to the interference cancellation filter 304 as discussed above.

The interference cancellation filter 1004 compensates for the interference and/or distortion in the presence of the one or more time-varying conditions embedded in the active signaling dimensions of the noisy sequence of data 350 to provide a noise compensated sequence of data 1052 in a substantially similar manner as the interference cancellation filter 304 as described above. The interference cancellation filter 1004 then adaptively adjusts an impulse response based upon the set of filter coefficients 1050 used to compensate for the interference and/or distortion embedded in the active signaling dimension of the noisy sequence of data 350 in the presence of the one or more time-varying conditions. The interference cancellation filter 1004 additionally provides the interference cancellation filter information signal 360 based on the active signaling dimensions of the noisy sequence of data 350 to the noise analyzer 904 and/or the filter coefficient updater module 1002 as described above.

The FEC decoder 1006 corrects for errors in the noise compensated sequence of data 1052 using any suitable decoding scheme to provide one of the noise compensated sequences of data 950.1 through 950.M in a similar manner as the FEC decoder 306 as discussed above. The FEC decoder 306 may provide the decoder information signal 362 based on the noise compensated sequence of data 1052 in a similar manner as the FEC decoder 306 as discussed above.

It should be noted that the interference cancellation filter information signals 952.1 through 952.M, as discussed above, may include one or more of the time domain spectral characterization information signal 454, the modified spectral characterization information signal 456, the interference cancellation filter information signal 360, and the decoder information signal 362.

Figure 10B:
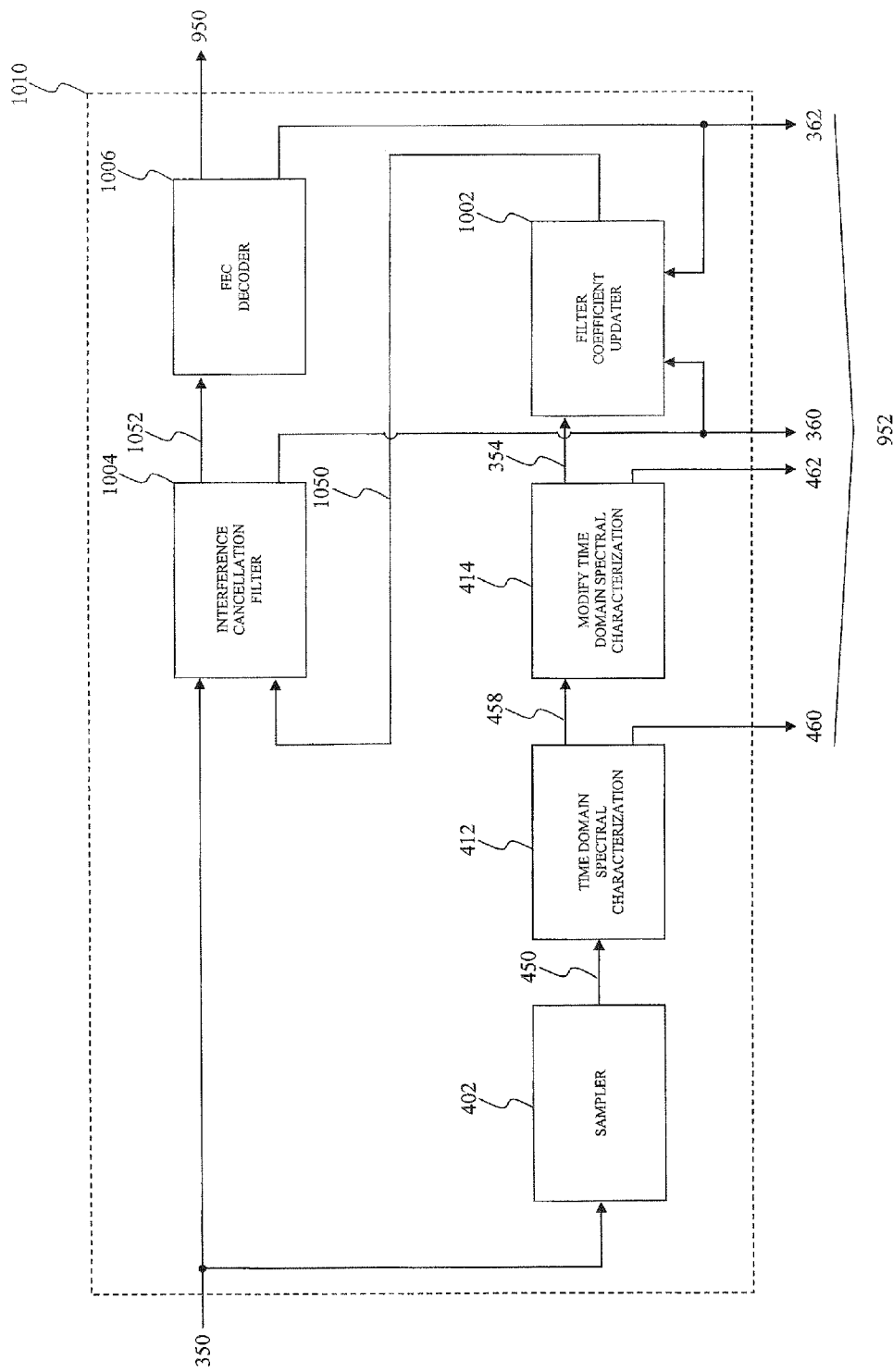
FIG. 10B illustrates a second block diagram of the interference cancellation filter used in the second communications receiver according to a second exemplary embodiment of the present invention.

Interference Cancellation Filter for Timeslots used in the Second Exemplary Communications Receiver FIG. 10B illustrates a second block diagram of the interference cancellation filter used in the second communications receiver according to a second exemplary embodiment of the present invention. An interference cancellation filter 1010 compensates for the interference and/or distortion in the presence of the one or more time-varying conditions embedded in the active timeslots of the noisy sequence of data 350 to provide one of the noise compensated sequences of data 950.1 through 950.M. The interference cancellation filter 1010 then adaptively adjusts its corresponding impulse response based upon one or more sets of filter weighting coefficients to compensate for the interference and/or distortion embedded in the active timeslot of the noisy sequence of data 350 in the presence of the one or more time-varying conditions. The interference cancellation filter 1010 may represent an exemplary embodiment of one of the interference cancellation filters 902.1 through 902.M.

The interference cancellation filter 1010 includes the sampling module 402, the time domain spectral characterization module 412, the modify time domain spectral characterization module 414, the filter coefficient updater module 1002, the interference cancellation filter 1004, and the FEC decoder 1006. The sampling module 402 samples the noisy sequence of data 350 to provide the sampled sequence of data 450 in a similar manner as discussed above. Specifically, the noisy sequence of data 350 may include one or more inactive timeslots, one or more active timeslots, or any combination of inactive and active timeslots. The sampling module 402 samples one or more of the inactive timeslots and or the active timeslots that are, in effect, inactive timeslots to provide the sampled sequence of data 450.

The time domain spectral characterization module 412 spectrally characterizes the sampled sequence of data 450 to provide the time domain spectral characterization 458. More specifically, the time domain spectral characterization module 412 may spectrally characterize the inactive timeslots to provide the time domain spectral characterization 458 and the time domain spectral characterization information signal 460.

The modify time domain spectral characterization module 414 modifies the time domain spectral characterization 458 to provide the modified sequence of data 354 and modified time domain spectral characterization information signal 462 in a substantially similar manner as discussed above.

The filter coefficient updater module 1002 provides a set of filter coefficients 1050 to the interference cancellation filter 1004 to be used to compensate for the presence of the one or more time-varying conditions embedded in the noisy sequence of data 350 in a similar manner as discussed above.

The interference cancellation filter 1004 compensates for the interference and/or distortion in the presence of the one or more time-varying conditions using the set of filter coefficients 1050 embedded in the noisy sequence of data 350 to provide the noise compensated sequence of data 1064 and provides the interference cancellation filter information signal 1066 based the noisy sequence of data 350 in a similar manner as discussed above.

The interference cancellation filter 1004 compensates for the interference and/or distortion in the presence of the one or more time-varying conditions embedded in the active timeslots of the noisy sequence of data 350 to provide a noise compensated sequence of data 1052 in a substantially similar manner as described above. The interference cancellation filter 1004 then adaptively adjusts its impulse response based upon the set of filter coefficients 1050 used to compensate for the interference and/or distortion embedded in the active timeslot of the noisy sequence of data 350 in the presence of the one or more time-varying conditions in a substantially similar manner as described above. The interference cancellation filter 1004 additionally provides the interference cancellation filter information signal 360 based on the active timeslots of the noisy sequence of data 350 to the noise analyzer 904 and/or the filter coefficient updater module 1002 in a substantially similar manner as described above.

The FEC decoder 1006 corrects for errors in the noise compensated sequence of data 1052 using any suitable decoding scheme to provide one of the noise compensated sequences of data 950.1 through 950.N in a substantially similar manner as described above. The FEC decoder 306 may provide the decoder information signal 362 based on the noise compensated sequence of data 1052 in a substantially similar manner as described above.

It should be noted that the interference cancellation filter information signals 952.1 through 952.M, as discussed above, may include one or more of the time domain spectral characterization information signal 460, the modified time domain spectral characterization information signal 462, the interference cancellation filter information signal 360, and the decoder information signal 362.

Figure 10C:
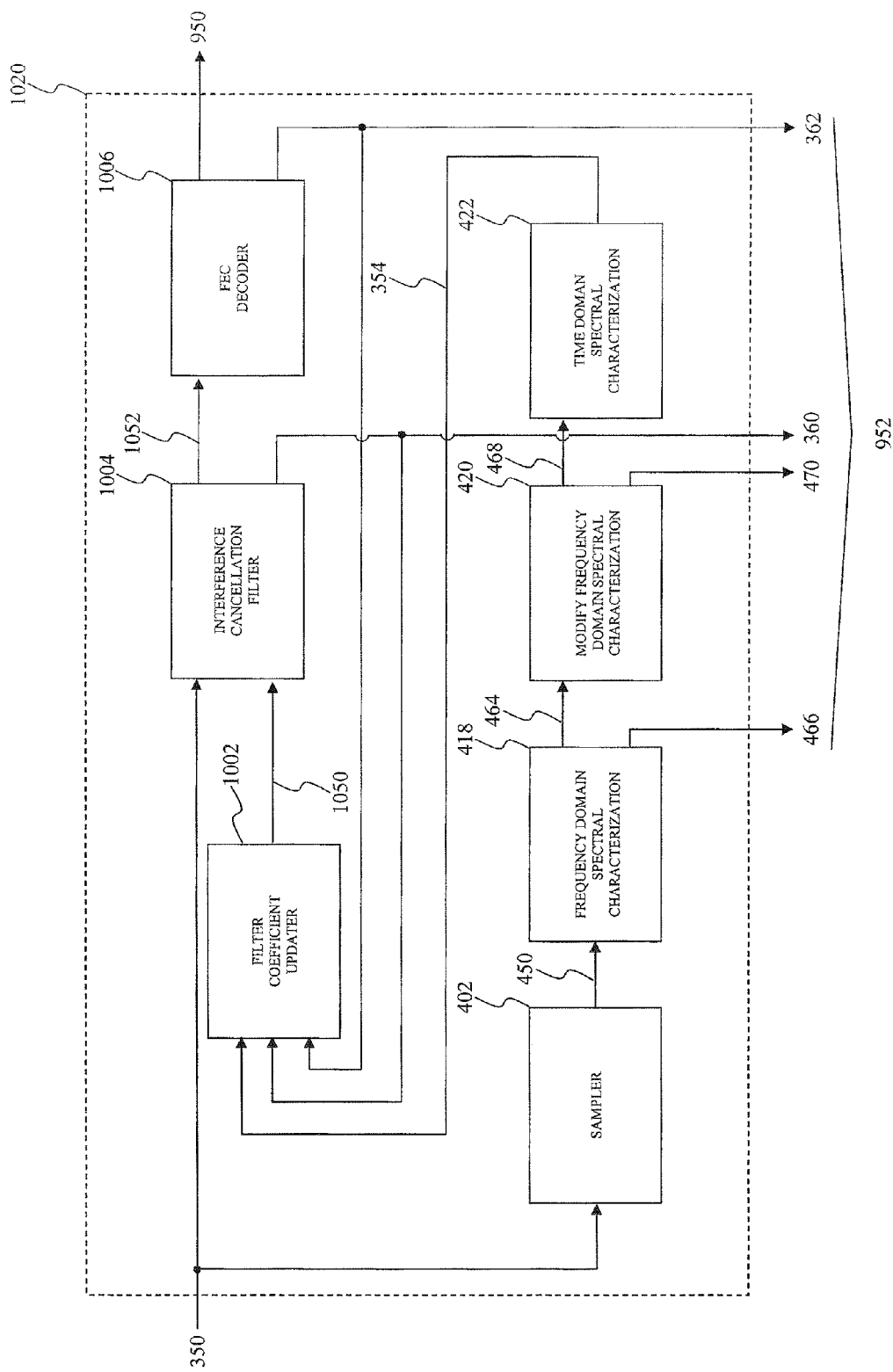
FIG. 10C illustrates a third block diagram of the interference cancellation filter used in the second communications receiver according to a third exemplary embodiment of the present invention.

Interference Cancellation Filter for Orthogonal Codes Used in the Second Exemplary Communications Receiver FIG. 10C illustrates a third block diagram of the interference cancellation filter used in the second communications receiver according to a third exemplary embodiment of the present invention. An interference cancellation filter 1020 compensates for the interference and/or distortion in the presence of the one or more time-varying conditions embedded in the active orthogonal codes of the noisy sequence of data 350 to provide one of the noise compensated sequences of data 950.1 through 950.N. The interference cancellation filter 1020 then adaptively adjusts its corresponding impulse response based upon one or more sets of filter weighting coefficients to compensate for the interference and/or distortion embedded in the active timeslot of the noisy sequence of data 350 in the presence of the one or more time-varying conditions. The interference cancellation filter 1020 may represent an exemplary embodiment of one of the interference cancellation filters 902.1 through 902.N.

The interference cancellation filter 1020 includes the frequency domain spectral characterization module 418, the modify frequency domain spectral characterization module 420, the time domain spectral characterization module 422, the filter coefficient updater module 1002, the interference cancellation filter 1004, and the FEC decoder 1006. The sampling module 402 samples the noisy sequence of data 350 to provide the sampled sequence of data 450 in a similar manner as discussed above. Specifically, the noisy sequence of data 350 may include one or more inactive timeslots, one or more active timeslots, or any combination of inactive and active timeslots. The sampling module 402 samples one or more of the inactive timeslots and or the active timeslots that are, in effect, inactive timeslots to provide the sampled sequence of data 450.

The frequency domain spectral characterization module 418 spectrally characterizes the sampled sequence of data 450 in the frequency domain to provide the frequency domain spectral characterization 464 in a similar manner as discussed above. The frequency domain spectral characterization module 418 additionally provides the frequency domain spectral characterization information signal 466 based on the sampled sequence of data 450 in a similar manner as discussed above.

The modify frequency domain spectral characterization module 420 modifies the frequency domain spectral characterization 464 in the frequency domain to provide the modified frequency domain spectral characterization 468 in a similar manner as discussed above. The modify frequency domain spectral characterization module 420 additionally provides the modified frequency domain spectral characterization information signal 470 in a similar manner as discussed above.

The time domain spectral characterization module 422 characterizes the modified frequency domain spectral characterization 468 in the time domain to provide the modified sequence of data 354 in a similar manner as discussed above.

The filter coefficient updater module 1008 provides the set of filter coefficients 1026 to the interference cancellation filter 1010. The set of filter coefficients 1026 may be used to compensate for the presence of the one or more time-varying conditions embedded in the noisy sequence of data 350 in a similar manner as discussed above. The filter coefficient updater module 1008 may use one or more of the modified sequence of data 1078, an interference cancellation filter information signal 1066, and a decoder information signal 1068 to update filter coefficients through the weight computation algorithm in a similar manner as the filter coefficient updaters 502.1 through 502.N and/or the filter coefficient updater 508 as discussed above.

It should be noted that the interference cancellation filter information signals 952.1 through 952.M, as discussed above, may include one or more of the frequency domain spectral characterization information signal 466, the modified frequency domain spectral characterization information signal 470, the interference cancellation filter information signal 360, and the decoder information signal 362.

Figure 11:
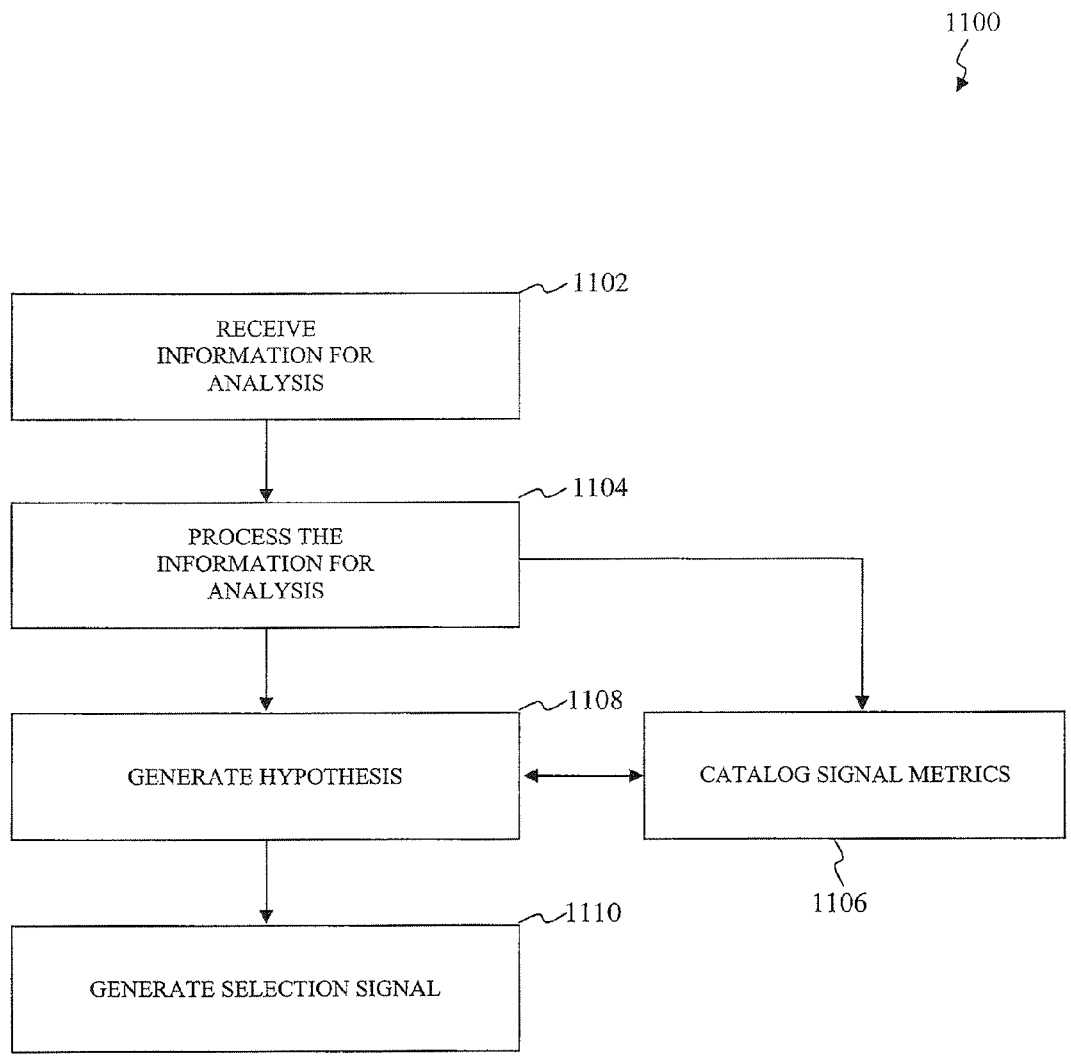
FIG. 11 is a flowchart of exemplary operational steps of a noise analyzer according to an aspect of the present invention.

FIG. 11 is a flowchart of exemplary operational steps of a noise analyzer according to an aspect of the present invention. The invention is not limited to this operational description. Rather, it will be apparent to persons skilled in the relevant art(s) from the teachings herein that other operational control flows are within the scope and spirit of the present invention. The following discussion describes the steps in FIG. 11

At step 1102, information for analysis is received by a noise analyzer module, such as the noise analyzer 308, the interference and/or distortion characterization module 408, and/or the noise analyzer 904 to provide some examples. The noise analyzer module may operate in a direct analysis method, an indirect analysis method, and/or a combination of the direct analysis method and the indirect analysis method. As an alternate to the direct analysis method and/or the indirect analysis method, a method of analysis such as disclosed in U.S. patent application Ser. No. 10/391,555, entitled "System and Method for Periodic Noise Avoidance in Data Transmission Systems," filed on May 18, 2004, now U.S. Pat. No. 7,050,516, which is incorporated by reference in its entirety, may be used.

At step 1104, the information for analysis from step 1102 is processed by the noise analyzer to compute one or more signal metrics of the communications signal. The direct analysis method processes the information for analysis in non-real-time. As a result of the non-real-time processing in the direct analysis method, an interference cancellation filter, such as the interference cancellation filter 304, and/or the interference cancellation filters 902.1 through 902.N to provide some examples, may buffer or delay the communications signal by one or more bits to allow for the processing of the information for analysis. The non-real-time processing allows the noise analyzer to analyze the compensation for the interference and/or distortion in the presence of the one or more time-varying conditions embedded in the communications signal.

For example, the noise analyzer may hypothesize that the one or more time-varying conditions are present and/or absent from the communications signal. The noise analyzer may monitor parameters of the interference cancellation filter, such as, but not limited to, filter coefficients to provide an example, to determine an accuracy of the hypothesis. In contrast, the indirect analysis method processes the information for analysis in real-time. In an exemplary embodiment, the noise analyzer hypothesizes whether the communications signal includes a white or a flat noise spectrum or a noise spectrum including the interference and/or distortion in the presence of the one or more time-varying conditions.

At step 1106, the one or more signal metrics from step 1104 are cataloged by the noise analyzer based upon a hypothesis from step 1108. The noise analyzer stores and/or updates the one or more signal metrics to identify the interference and/or distortion in the presence and/or absence of the one or more time-varying conditions based upon the hypothesis from step 1108. As an example, if step 1108 hypothesizes the interference and/or distortion includes a first time-varying condition and a second time-varying condition, the noise analyzer stores and/or updates the one or more signal metrics corresponding to first time-varying condition. The one or more signal metrics corresponding to the second time-varying condition continue in their current state.

At step 1108, the one or more signal metrics from step 1104 are compared with the one or more signal metrics cataloged in step 1106 to generate a hypothesis relating to the presence and/or absence of the one or more time-varying conditions embedded in the communications signal. In an exemplary embodiment, the hypothesis includes a particular condition is embedded in the communications signal in the presence of the one or more time-varying conditions.

At step 1110, a selection signal, such as the filter coefficient selection signal 356 and/or the interference cancellation filter selection signal 854 to provide some examples, is generated based upon the hypothesis from step 1108.

CONCLUSION

It is to be appreciated that the Detailed Description section, and not the Abstract section, is intended to be used to interpret the claims. The Abstract section may set forth one or more, but not all exemplary embodiments, of the present invention, and thus, are not intended to limit the present invention and the appended claims in any way.

The present invention has been discussed above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

What is claimed is:

1. A communications receiver configured to compensate for interference and/or distortion embedded onto a sequence of data, comprising:

a noise analyzer configured to analyze the interference and/or distortion and provide a filter coefficient selection signal indicative of the presence or absence of a first time-varying interference and/or distortion condition and of the presence or absence of a second time-varying interference and/or distortion condition in the interference and/or distortion;

a coefficient generator configured to select a set of filter coefficients in accordance with the filter coefficient selection signal; and an interference cancellation filter configured to compensate for the interference and/or distortion embedded onto the sequence of data using the set of filter coefficients to provide a noise compensated sequence of data.

2. The communications receiver of claim 1, wherein the noise analyzer comprises:

a sampling module configured to sample a first portion of the sequence of data to provide a sampled sequence of data;

a time domain spectral characterization module configured to spectrally characterize the sampled sequence of data in a time domain to provide a time domain spectral characterization;

a modify time domain spectral characterization module configured to modify the time domain spectral characterization in the time domain to provide a modified sequence of data; and an interference and/or distortion characterization module configured to analyze the interference and/or distortion based upon at least one of a time domain spectral characterization information signal and a modified time domain spectral characterization information signal, the time domain spectral characterization information signal including statistical metrics of the sampled sequence of data and the modified time domain spectral characterization information signal including, statistical metrics of the time domain spectral characterization.

3. The communications receiver of claim 2, wherein the time domain spectral characterization module is configured to determine an autocorrelation function of the sampled sequence of data to provide an autocorrelation matrix as the time domain spectral characterization.

4. The communications receiver of claim 2, wherein the modify time domain spectral characterization module is configured to modify the time domain spectral characterization by performing at least one of:

raising a noise floor, and introducing spectral characteristics that relate to a previously present interference and/or distortion that are expected but that have not recently been present to provide the modified sequence of data.

5. The communications receiver of claim 1, wherein the noise analyzer comprises:

a sampling module configured to sample a first portion of the sequence of data to provide a sampled sequence of data;

a frequency domain spectral characterization module configured to spectrally characterize the sampled sequence of data in a frequency domain to provide a frequency domain spectral characterization;

a modify frequency domain spectral characterization module configured to modify the frequency domain spectral characterization in the frequency domain to provide a modified frequency domain spectral characterization;

a time domain spectral characterization module configured to characterize the modified frequency domain spectral characterization in a time domain to provide a modified sequence of data; and an interference and/or distortion characterization module configured to analyze the interference and/or distortion based upon at least one of a frequency domain spectral characterization information signal and a modified frequency domain spectral characterization information signal, the frequency domain spectral characterization information signal including statistical metrics of the sampled sequence of data and the modified frequency domain spectral characterization information signal including statistical metrics of the time domain spectral characterization.

6. The communications receiver of claim 5, wherein the frequency domain spectral characterization module is configured to transform the sampled sequence of data from the time domain to the frequency domain.

7. The communications receiver of claim 5, wherein the frequency domain spectral characterization module is configured to perform a Fast Fourier Transform (FFT) upon the sampled sequence of data to provide the frequency domain spectral characterization.

8. The communications receiver of claim 5, wherein the modify frequency domain spectral characterization module is configured to modify the frequency domain spectral characterization by performing at least one of raising a noise floor, and introducing spectral characteristics that relate to a previously present interference and/or distortion that are expected but that have not recently been present to provide the modified sequence of data.

9. The communications receiver of claim 5, wherein the time domain spectral characterization module is configured to perform an Inverse Fast Fourier Transform (IFFT) upon the modified frequency domain spectral characterization to provide the modified sequence of data.

10. The communications receiver of claim 1, wherein the coefficient generator comprises:

a first filter coefficient updater corresponding to the absence of the first time-varying interference and/or distortion condition and the second time-varying interference and/or distortion condition;

a second filter coefficient updater corresponding to the presence of the first time-varying interference and/or distortion condition;

a third filter coefficient updater corresponding to the presence of the second time-varying interference and/or distortion condition; and a fourth filter coefficient updater corresponding to the presence of the first time-varying interference and/or distortion condition and the second time-varying interference and/or distortion condition.

11. The communications receiver of claim 10, wherein the coefficient generator is configured to select the set of filter coefficients from the first filter coefficient updater when the filter coefficient selection signal indicates the absence of the first time-varying interference and/or distortion condition and the second time-varying interference and/or distortion condition.

12. The communications receiver of claim 10, wherein the coefficient generator is configured to select the set of filter coefficients from the second filter coefficient updater when the filter coefficient selection signal indicates the presence of the first time-varying interference and/or distortion condition.

13. The communications receiver of claim 10, wherein the coefficient generator is configured to select the set of filter coefficients from the third filter coefficient updater when the filter coefficient selection signal indicates the presence of the second time-varying interference and/or distortion condition.

14. The communications receiver of claim 10, wherein the coefficient generator is configured to select the set of filter coefficients from the fourth filter coefficient updater when the filter coefficient selection signal indicates the presence of the first time-varying interference and/or distortion condition and the second time-varying interference and/or distortion condition.

15. A method for compensating for interference and/or distortion embedded onto a sequence of data, comprising:
    analyzing the interference and/or distortion to generate a filter coefficient selection signal indicative of the presence or absence of a first time-varying interference and/or distortion condition and of the presence or absence of a second time-varying interference and/or distortion condition in the interference and/or distortion;
    selecting a set of filter coefficients in accordance with the filter selection signal; and compensating for the interference and/or distortion embedded onto the sequence of data using the set of filter coefficients to generate a noise compensated sequence of data.

16. The method of claim 15, wherein analyzing the interference and/or distortion comprises:
    sampling a first portion of the sequence of data to generate a sampled sequence of data;
    generating a time domain spectral characterization of the sampled sequence of data; and
    modifying the time domain spectral characterization to generate a modified sequence of data.

17. The method of claim 16, wherein analyzing the interference and/or distortion further comprises:
    analyzing the interference and/or distortion based on a time domain spectral characterization information signal, the time domain spectral characterization signal including statistical metrics of the sampled sequence of data.

18. The method of claim 15, wherein analyzing the interference and/or distortion comprises:
    sampling a first portion of the sequence of data to generate a sampled sequence of data;
    generating a frequency domain spectral characterization of the sampled sequence of data;
    modifying the frequency domain spectral characterization to generate a modified frequency domain spectral characterization; and
    generating a modified sequence of data from the modified frequency domain spectral characterization.

19. The method of claim 18, wherein analyzing the interference and/or distortion further comprises:
    analyzing the interference and/or distortion based on a frequency domain spectral characterization information signal, the frequency domain spectral characterization signal including statistical metrics of the sampled sequence of data.

20. The method of claim 18, wherein generating the frequency domain spectral characterization of the sampled sequence of data comprises:
    performing a Fast Fourier Transform (FFT) upon the sample sequence of data.

* * * * *

UNITED STATES PATENT AND TRADEMARK OFFICE
CERTIFICATE OF CORRECTION

PATENT NO. : 8,401,132 B2
APPLICATION NO. : 12/899997
DATED : March 19, 2013
INVENTOR(S) : Kolze et al.

Page 1 of 1

It is certified that error appears in the above-identified patent and that said Letters Patent is hereby corrected as shown below:

In the Claims:

Column 35, Line 41, "including," should be replaced with --including--.

Column 36, Line 31, "one of" should be replaced with --one of:--.

Signed and Sealed this
Twenty-eighth Day of May, 2013

Teresa Stanek Rea
*Acting Director of the United States Patent and Trademark Office*